United States Patent
Zinck et al.

(10) Patent No.: US 11,901,504 B2
(45) Date of Patent: *Feb. 13, 2024

(54) RECHARGEABLE BATTERY CELL HAVING AN $SO_2$-BASED ELECTROLYTE

(71) Applicant: Innolith Technology AG, Basel (CH)

(72) Inventors: Laurent Zinck, Mothern (FR); Claudia Wollfarth, Karlsruhe (DE); Heide Biollaz, Waldshut (DE)

(73) Assignee: Innolith Technology AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,934

(22) Filed: Nov. 18, 2021

(65) Prior Publication Data

US 2022/0085409 A1 Mar. 17, 2022

Related U.S. Application Data

(63) Continuation of application No. PCT/EP2020/071579, filed on Jul. 30, 2020.

(30) Foreign Application Priority Data

Jul. 31, 2019 (EP) .................................... 19189435

(51) Int. Cl.
*H01M 10/05* (2010.01)
*H01M 10/056* (2010.01)
(Continued)

(52) U.S. Cl.
CPC ........ *H01M 10/056* (2013.01); *C01G 49/009* (2013.01); *C01G 51/42* (2013.01);
(Continued)

(58) Field of Classification Search
None
See application file for complete search history.

(56) References Cited

U.S. PATENT DOCUMENTS

| 4,891,281 A | 1/1990 | Kuo et al. |
| 6,730,441 B1 | 5/2004 | Hambitzer et al. |

(Continued)

FOREIGN PATENT DOCUMENTS

| CN | 101622738 A | 1/2010 |
| CN | 102742049 A | 10/2012 |

(Continued)

OTHER PUBLICATIONS

English Translation of International Search Report and Written Opinion of the International Searching Agency, PCT/EP2020/071579, dated Oct. 21, 2020, 10 pages.

(Continued)

*Primary Examiner* — Jonathan G Leong
*Assistant Examiner* — Tony S Chuo
(74) *Attorney, Agent, or Firm* — Bose McKinney & Evans LLP

(57) ABSTRACT

This disclosure relates to a rechargeable battery cell comprising an active metal, at least one positive electrode having a discharge element, at least one negative electrode having a discharge element, a housing and an electrolyte, the negative electrode comprising metallic lithium at least in the charged state of the rechargeable battery cell and the electrolyte being based on $SO_2$ and comprising at least one first conducting salt which has the formula (I), Formula (I)

(Continued)

M being a metal selected from the group formed by alkali metals, alkaline earth metals, metals of group 12 of the periodic table of the elements, and aluminum; x being an integer from 1 to 3; the substituents $R^1$, $R^2$, $R^3$ and $R^4$ being selected independently of one another from the group formed by $C_1$-$C_{10}$ alkyl, $C_2$-$C_{10}$ alkenyl, $C_2$-$C_{10}$ alkynyl, $C_3$-$C_{10}$ cycloalkyl, $C_6$-$C_{14}$ aryl and $C_5$-$C_{14}$ heteroaryl; and Z being aluminum or boron.

41 Claims, 15 Drawing Sheets

(51) Int. Cl.

| | | |
|---|---|---|
| C07F 5/04 | (2006.01) | |
| C07F 5/06 | (2006.01) | |
| H01M 4/505 | (2010.01) | |
| H01M 4/525 | (2010.01) | |
| H01M 10/0525 | (2010.01) | |
| H01M 4/131 | (2010.01) | |
| H01M 4/133 | (2010.01) | |
| H01M 4/134 | (2010.01) | |
| H01M 4/136 | (2010.01) | |
| H01M 4/36 | (2006.01) | |
| H01M 4/38 | (2006.01) | |
| H01M 4/48 | (2010.01) | |
| H01M 4/485 | (2010.01) | |
| H01M 4/58 | (2010.01) | |
| H01M 4/587 | (2010.01) | |
| H01M 4/62 | (2006.01) | |
| H01M 4/66 | (2006.01) | |
| H01M 4/80 | (2006.01) | |
| H01M 10/0563 | (2010.01) | |
| H01M 4/583 | (2010.01) | |
| C01G 49/00 | (2006.01) | |
| C01G 51/00 | (2006.01) | |
| C01G 53/00 | (2006.01) | |
| H01M 4/74 | (2006.01) | |
| H01M 10/054 | (2010.01) | |
| H01M 10/0562 | (2010.01) | |
| H01M 4/02 | (2006.01) | |

(52) U.S. Cl.
CPC ............. *C01G 53/50* (2013.01); *C01G 53/54* (2013.01); *C07F 5/04* (2013.01); *C07F 5/069* (2013.01); *H01M 4/131* (2013.01); *H01M 4/133* (2013.01); *H01M 4/134* (2013.01); *H01M 4/136* (2013.01); *H01M 4/364* (2013.01); *H01M 4/382* (2013.01); *H01M 4/386* (2013.01); *H01M 4/483* (2013.01); *H01M 4/485* (2013.01); *H01M 4/505* (2013.01); *H01M 4/525* (2013.01); *H01M 4/583* (2013.01); *H01M 4/5805* (2013.01); *H01M 4/587* (2013.01); *H01M 4/5825* (2013.01); *H01M 4/623* (2013.01); *H01M 4/661* (2013.01); *H01M 4/745* (2013.01); *H01M 4/808* (2013.01); *H01M 10/054* (2013.01); *H01M 10/0525* (2013.01); *H01M 10/0562* (2013.01); *H01M 10/0563* (2013.01); *H01M 2004/027* (2013.01); *H01M 2004/028* (2013.01); *H01M 2300/002* (2013.01); *H01M 2300/0071* (2013.01)

(56) References Cited

U.S. PATENT DOCUMENTS

| | | |
|---|---|---|
| 7,901,811 B2 | 3/2011 | Hambitzer et al. |
| 9,263,745 B2 | 2/2016 | Zinck et al. |
| 2002/0015884 A1 | 2/2002 | Schmidt et al. |
| 2005/0106467 A1 | 5/2005 | Hambitzer et al. |
| 2006/0068293 A1 | 3/2006 | Kim et al. |
| 2007/0065714 A1 | 3/2007 | Hambitzer et al. |
| 2009/0142668 A1* | 6/2009 | Ishii ............... H01M 10/052 429/231.95 |
| 2010/0062341 A1 | 3/2010 | Hambitzer |
| 2011/0287304 A1 | 11/2011 | Zinck et al. |
| 2013/0032753 A1* | 2/2013 | Yamamoto ........... H01M 4/525 429/223 |
| 2013/0224603 A1* | 8/2013 | Chen ................. H01M 4/625 429/188 |
| 2014/0220428 A1 | 8/2014 | Zinck et al. |
| 2015/0093632 A1 | 4/2015 | Pszolla et al. |
| 2017/0117547 A1 | 4/2017 | Fanous et al. |
| 2017/0288211 A1 | 10/2017 | Zhamu et al. |
| 2018/0254516 A1 | 9/2018 | Han et al. |
| 2018/0277845 A1 | 9/2018 | Yamaya et al. |
| 2019/0207262 A1 | 7/2019 | Delobel |
| 2019/0260074 A1 | 8/2019 | Hambitzer |

FOREIGN PATENT DOCUMENTS

| | | |
|---|---|---|
| CN | 102742062 A | 10/2012 |
| CN | 105723546 A | 6/2016 |
| CN | 108352515 A | 7/2018 |
| CN | 108630909 A | 10/2018 |
| CN | 109417192 A | 3/2019 |
| EP | 2 360 772 A1 | 8/2011 |
| EP | 2 534 719 A2 | 12/2012 |
| EP | 2 827 430 A1 | 1/2015 |
| EP | 2 954 588 B1 | 4/2017 |
| JP | 2001-143750 A | 5/2001 |
| JP | 2001-210332 A | 8/2001 |
| JP | 2002-305026 A | 10/2002 |
| JP | 2003-157896 A | 5/2003 |
| JP | 2008-277001 A | 11/2008 |
| JP | 4306858 B2 | 8/2009 |
| JP | 2013-519967 A | 5/2013 |
| JP | 5901539 B2 | 4/2016 |
| KR | 10-2015-0115788 A | 10/2015 |
| KR | 10-2018-0013512 A | 2/2018 |
| KR | 10-2018-0114256 A | 10/2018 |
| KR | 10-2019-0003940 A | 1/2019 |
| RU | 2248071 C2 | 3/2005 |
| RU | 2 272 043 C2 | 3/2006 |
| RU | 2 325 014 C1 | 5/2008 |
| RU | 2 343 601 C2 | 1/2009 |
| WO | WO 00/79631 A1 | 12/2000 |
| WO | WO 02/00773 A2 | 1/2002 |
| WO | WO 2008/147751 A1 | 12/2008 |
| WO | WO 2012/042005 A1 | 4/2012 |
| WO | WO 2015/074006 A1 | 5/2015 |
| WO | WO 2017/178543 A1 | 10/2017 |
| WO | WO 2018/115024 A1 | 6/2018 |

OTHER PUBLICATIONS

Gao et al., LiAlCl4—3SO2: A Promising Inorganic Electrolyte for Stable Li Metal Anode at Room and Low Temperature, Ionics, 2019, vol. 25, No. 9, pp. 4137-4147.

Park et al., Performances of Li/LixCoO2 Cells in LiAlCl4 • 3SO2 Electrolyte, Journal of Power Sources, 1997, vol. 68, No. 2, pp. 338-343.

Krossing, The Facile Preparation of Weakly Coordinating Anions: Structure and Characterisation of Silverpolyfluoroalkoxyaluminates AgAl(ORF)4, Calculation of the Alkoxide Ion Affinity, 2001, Chem. Eur. J., vol. 7, No. 2, pp. 490-502.

Ivanova et al., Relative Lewis Basicities of Six Al(ORF)4—Superweak Anions and the Structures of LiAl{OCH (CF3)2}4 and

(56) References Cited

OTHER PUBLICATIONS

[1-Et-3-Me-1,3-C3H3N2]-[Li{Al{OCH(CF3)2}4}2], 2001, Chem. Eur. J., vol. 7, No. 2, pp. 503-510.
Tsujioka et al., Conductivities and Electrochemical Stabilities of Lithium Salts of Polyfluoroalkoxyaluminate Superweak Anions, Journal of The Electrochemical Society, 2004, vol. 151, No. 9, pp. A1418-A1423.
Cheng et al., Dendrite-Free Lithium Deposition Induced by Uniformly Distributed Lithium Ions for Efficient Lithium Metal Batteries, Advanced Materials, 2016, vol. 28, pp. 2888-2895.
Rohde et al., Li[B(OCH2CF3)4]: Synthesis, Characterization and Electrochemical Application as a Conducting Salt for LiSB Batteries, ChemPhysChem, 2015, vol. 16, pp. 666-675.

* cited by examiner

RECHARGEABLE BATTERY CELL HAVING AN $SO_2$-BASED ELECTROLYTE

RELATED APPLICATIONS

This application is a continuation of PCT/EP2020/071579, filed Jul. 30, 2020, which claims priority to EP 19 189 435.1, filed Jul. 31, 2019, the entire disclosures of both of which are hereby incorporated herein by reference.

BACKGROUND

This disclosure relates to a rechargeable battery cell having an $SO_2$-based electrolyte.

Rechargeable battery cells are of great importance in many technical fields. They are often used for applications which require only small rechargeable battery cells having relatively low current intensities, for example, for the operation of cell phones. In addition, there is also a great need for larger rechargeable battery cells for high-energy applications, with mass storage of energy in the form of battery cells being of particular importance for the electric propulsion of vehicles.

High energy density is an important requirement for these types of rechargeable battery cells. This means that the rechargeable battery cell should contain as much electrical energy as possible per unit weight and volume. Lithium has proven to be particularly advantageous as an active metal for this purpose. Lithium is the metal having the lowest atomic number and therefore having the largest theoretical specific capacity of 3.884 mAh/g. It is the most electronegative metal (−3.10 V vs. standard hydrogen electrode, abbr.: SHE), thereby generating the highest possible cell voltage with respect to a given positive electrode. It is also the lightest metal (0.54 g/cm$^3$), which contributes to the highest possible gravimetric energy density (Wh/Kg) or specific energy density (Wh/L).

The active metal of a rechargeable battery cell is the metal whose ions within the electrolyte migrate to the negative or positive electrode when the cell is being charged or discharged and participate in electrochemical processes there. These electrochemical processes lead directly or indirectly to the release of electrons into the external circuit or to the absorption of electrons from the external circuit. Rechargeable battery cells comprising lithium as the active metal of the negative electrode are also referred to as lithium cells.

The positive electrodes of lithium cells are designed as insertion electrodes. The term "insertion electrode" in the sense of this disclosure refers to electrodes which have a crystal structure into which ions of the active material can be stored and removed during operation of the lithium cell. This means that the electrode processes can take place not only on the surface of the electrode, but also within the crystalline structure. The positive electrode, for example, consists of lithium cobalt oxide ($LiCoO_2$). When charging the lithium cell, the ions of the active metal are removed from the positive electrode and deposited in the negative electrode as metallic lithium. The reverse process takes place when the lithium cell is discharged.

The electrolyte is also an important functional element of every rechargeable battery cell. It usually comprises a solvent or a solvent blend and at least one conducting salt. Solid electrolytes or ionic liquids, for example, do not comprise a solvent, but only the conducting salt. The electrolyte is in contact with the positive and negative electrodes of the battery cell. At least one ion of the conducting salt (anion or cation) is sufficiently mobile in the electrolyte such that a charge transport between the electrodes, required for the functioning of the rechargeable battery cell, can take place through ionic conduction. The electrolyte is oxidatively electrochemically decomposed from a certain upper cell voltage of the rechargeable battery cell. This process often leads to an irreversible destruction of the electrolyte components, and thus to a failure of the rechargeable battery cell. Reductive processes can also decompose the electrolyte when falling below a certain cell voltage. In order to avoid these processes, the positive and negative electrodes are chosen such that the cell voltage is below or above the decomposition voltage of the electrolyte. The electrolyte thus determines the voltage window, in the range of which a rechargeable battery cell can be operated reversibly, that is, repeatedly charged and discharged.

The lithium cells known from the prior art comprise an electrolyte consisting of an organic solvent or solvent blend and a conducting salt dissolved therein. The conducting salt is a lithium salt such as lithium hexafluorophosphate ($LiPF_6$). The solvent blend can comprise, for example, ethylene carbonate. The electrolyte LP57, which has the composition 1 M $LiPF_6$ in EC (ethylene carbonate): EMC (ethyl methyl carbonate) 3:7, is an example of such an electrolyte. Due to the organic solvent or solvent blend, these kinds of lithium cells are also referred to as organic lithium cells.

Unintentional overcharging of organic lithium cells leads to irreversible decomposition of electrolyte components. The oxidative decomposition of the organic solvent and/or the conducting salt takes place on the surface of the positive electrode. The reaction heat generated during this decomposition and the resulting gaseous products are responsible for the subsequent so-called "thermal runaway" and the resulting destruction of the organic lithium cell. The vast majority of charging protocols for these organic lithium cells use the cell voltage as an indicator of the end of charging. Accidents caused by a thermal runaway are particularly likely to occur when using multi-cell battery packs in which a plurality of organic lithium cells having dissimilar capacities are connected in series.

Also this reductive decomposition of the organic electrolyte of a lithium cell on the negative electrode is irreversible. No organic solvents are thermodynamically stable with respect to lithium or with respect to lithium which is stored in carbon ($Li_xC_6$). However, many solvents form a passivation film on the electrode surface of the negative electrode. This film spatially separates the solvent from the electrode, but is ionically conductive and thus enables the passage of lithium ions. The passivation film, the so-called "Solid Electrolyte Interphase" (SEI), gives stability to the system, by which the production of lithium cells is made possible. Lithium is integrated into the passivation film during the formation of the SEI. This process is irreversible and is therefore observed as a loss of capacity.

This irreversible loss of capacity, also referred to as the coating layer capacity, depends on the electrolyte formulation and the electrodes used. In organic lithium cells, the electrolyte decomposition and formation of layers comprising lithium ions often continues during further operation of the lithium cell and is responsible for the loss of capacity and thus for a shorter service life of the cell. Capacity losses can also occur during the storage of charged lithium cells. This so-called self-discharge can be based on both irreversible processes (electrolyte decomposition) and reversible processes in which the lithium stored in the negative electrode is transferred to the electrolyte solution and is available again the next time it is charged.

Organic lithium cells are therefore problematic in terms of their stability and long-term operational reliability. Safety risks are also caused in particular by the flammability of the organic solvent or solvent blend. When an organic lithium cell catches fire or even explodes, the metallic lithium forms a highly reactive substance and the organic solvent in the electrolyte forms a combustible material. Additional measures must be taken to avoid such safety risks.

A further development known from prior art therefore provides for the use of an electrolyte based on sulfur dioxide ($SO_2$) instead of an organic electrolyte for rechargeable battery cells. Rechargeable battery cells, which comprise an $SO_2$-based electrolyte, exhibit, among other things, high ionic conductivity. The term "$SO_2$-based electrolyte" refers to an electrolyte which comprises $SO_2$ not merely as an additive at low concentrations, but in which the mobility of the ions in the conducting salt, which is comprised in the electrolyte and which causes the charge transport, is at least in part, largely or even completely ensured by $SO_2$. The $SO_2$ thus serves as a solvent for the conducting salt. The conducting salt can form a liquid solvate complex with the gaseous $SO_2$, whereby the $SO_2$ is bound and the vapor pressure is noticeably reduced compared to the pure $SO_2$. Electrolytes having low vapor pressure are produced. Compared to the organic electrolytes described above, these $SO_2$-based electrolytes have the advantage of being non-combustible. Safety risks, which might occur due to the electrolyte's flammability, can thus be excluded.

The use of metallic lithium as the negative electrode active material in rechargeable cells poses various problems. Lithium does not deposit uniformly during charging, but rather in the form of dendrites. The uncontrollable lithium dendrite growth leads to an accumulation of a highly reactive metal having a large surface area and can lead to safety-critical states. The thermodynamic instability of metallic lithium causes irreversible and continuous reactions between said lithium and the electrolyte. As a result, unintentionally thick passivation layers (SEI), which consume lithium and electrolyte components, are created on the lithium metal surface. This increases the internal resistance, and the service life of the lithium cell is shortened. Large volumetric and morphological changes can occur in the lithium metal anode with repeated charging and discharging. The SEI films mentioned are too unstable to completely suppress such significant changes.

Solutions to the above-mentioned problems in connection with a metallic lithium anode are being sought both in lithium cells having organic electrolyte solutions and in battery cells having the $SO_2$-based electrolyte.

The authors of the document [V1]
"Dendrite-Free Lithium Deposition Induced by Uniformly Distributed Lithium Ions for Efficient Lithium Metal Batteries"
Xin-Bing Cheng, Ting-Zheng Hou, Rui Zhang, Hong-Jie Peng, Chen-Zi Zhao,
Jia-Qi Huang and Qiang Zhang
Adv. Mater. 2016, 28, 2888-2895
report on a lithium metal battery having an organic electrolyte. A 3D glass fiber fabric having a large number of polar groups is used for the deposition of lithium to obtain a dendrite-free lithium metal anode.

U.S. Pat. No. 7,901,811 B2 (hereinafter referred to as [V2]) describes a lithium metal cell having an $SO_2$-based electrolyte having the conducting salt lithium tetrachloroaluminate ($LiAlCl_4$). In order to avoid the disadvantages of dendritic deposition, a porous structure formed from solid particles is proposed, the structure being designed and arranged such that the lithium deposited during charging of the lithium metal cell penetrates from the surface of the discharger into the pores of the porous structure and is deposited again there.

A disadvantage that also occurs, among other things, with these $SO_2$-based electrolytes is that any hydrolysis products formed in the presence of residual amounts of water react with the cell components of the rechargeable battery cell and thus lead to the formation of undesired by-products. Because of this, in the manufacture of such rechargeable battery cells having an $SO_2$-based electrolyte, attention should be paid to minimizing the residual water content comprised in the electrolyte and the cell components.

A further problem with $SO_2$-based electrolytes is that many conducting salts, in particular also known for organic lithium cells, are not soluble in $SO_2$. Measurements showed that $SO_2$ is a poor solvent for many conducting salts, such as lithium fluoride (LiF), lithium bromide (LiBr), lithium sulfate ($Li_2SO_4$), lithium bis(oxalato)borate (LiBOB), lithium hexafluoroarsenate ($LiAsF_6$), lithium tetrafluoroborate ($LiBF_4$), trilithium hexafluoroaluminate ($Li_3AlF_6$), lithium hexafluoroantimonate ($LiSbF_6$), lithium difluoro(oxalato)borate ($LiBF_2C_2O_4$), lithium bis(trifluoromethanesulfonyl)imide (LiTFSI), lithium metaborate ($LiBO_2$), lithium aluminate ($LiAlO_2$), lithium triflate ($LiCF_3SO_3$) and lithium chlorosulfonate ($LiSO_3Cl$). The solubility of these conducting salts in $SO_2$ is approx. $10^{-2}$-$10^{-4}$ mol/L (see Table 1). With these low salt concentrations, it can be assumed that there are at most only low conductivities, which are not sufficient for the useful operation of a rechargeable battery cell.

TABLE 1

Solubility of Various Salts in $SO_2$

| Conducting Salt | Solubility/mol/L in $SO_2$ | Conducting Salt | Solubility/mol/L in $SO_2$ |
| --- | --- | --- | --- |
| LiF | $2.1 \cdot 10^{-3}$ | $LiPF_6$ | $1.5 \cdot 10^{-2}$ |
| LiBr | $4.9 \cdot 10^{-3}$ | $LiSbF_6$ | $2.8 \cdot 10^{-4}$ |
| $Li_2SO_4$ | $2.7 \cdot 10^{-4}$ | $LiBF_2(C_2O_4)$ | $1.4 \cdot 10^{-4}$ |
| $LiB(C_2O_4)_2$ | $3.2 \cdot 10^{-4}$ | $CF_3SO_2NLiSO_2CF_3$ | $1.5 \cdot 10^{-2}$ |
| $Li_3PO_4$ | — | $LiBO_2$ | $2.6 \cdot 10^{-4}$ |
| $Li_3AlF_6$ | $2.3 \cdot 10^{-3}$ | $LiAlO_2$ | $4.3 \cdot 10^{-4}$ |
| $LiBF_4$ | $1.7 \cdot 10^{-3}$ | $LiCF_3SO_3$ | $6.3 \cdot 10^{-4}$ |
| $LiAsF_6$ | $1.4 \cdot 10^{-3}$ | | |

In order to further improve the possible uses and properties of rechargeable battery cells that comprise an $SO_2$-based electrolyte, the object of this disclosure is to specify a rechargeable battery cell having an $SO_2$-based electrolyte, which, compared to the rechargeable battery cells known from the prior art exhibits improved electrical performance data, in particular high energy density;

has a stable coating layer on the negative electrode, whereby the coating layer capacity should be low and no further reductive electrolyte decomposition should occur on the negative electrode during further operation;

comprises an $SO_2$-based electrolyte, which contributes to the deposition of metallic lithium being as uniform as possible;

comprises an $SO_2$-based electrolyte which exhibits good solubility for conducting salts and is therefore a good ion conductor and electronic insulator, so that ion transport can be facilitated and self-discharge can be reduced to a minimum;

comprises an $SO_2$-based electrolyte that is also inert to other components of the rechargeable battery cell, such as separators, electrode materials and cell packaging materials;

is resistant against various misuses such as electrical, mechanical or thermal;

comprises an $SO_2$-based electrolyte, which exhibits an increased stability against residual amounts of water in the cell components of rechargeable battery cells;

has a wide electrochemical window, so that no oxidative electrolyte decomposition occurs at the positive electrode;

exhibits improved overcharging and deep discharging and less self-discharge and shows an increased service life, in particular a high number of usable charge and discharge cycles.

Such rechargeable battery cells should, in particular, also have very good electrical energy and performance data, high operational reliability and service life, in particular a large number of usable charge and discharge cycles, without the electrolyte decomposing during operation of the rechargeable battery cell.

SUMMARY

A rechargeable battery cell according to this disclosure comprises an active metal, at least one positive electrode having a discharge element, at least one negative electrode having a discharge element, a housing and an electrolyte. The negative electrode comprises metallic lithium as an active material, at least in the charged state of the rechargeable battery cell.

The electrolyte is based on $SO_2$ and comprises at least one first conducting salt. Said first conducting salt has the formula (I).

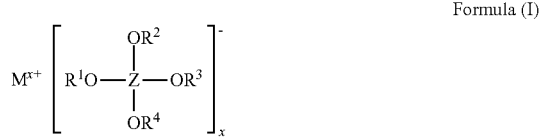

Formula (I)

In formula (I), M is a metal selected from the group formed by alkali metals, alkaline earth metals, metals of group 12 of the periodic table of the elements and aluminum. x is an integer from 1 to 3. The substituents $R^1$, $R^2$, $R^3$ and $R^4$ are selected independently of one another from the group formed by $C_1$-$C_{10}$ alkyl, $C_2$-$C_{10}$ alkenyl, $C_2$-$C_{10}$ alkynyl, $C_3$-$C_{10}$ cycloalkyl, $C_6$-$C_{14}$ aryl and $C_5$-$C_{14}$ heteroaryl. The central atom Z is either aluminum or boron.

The $SO_2$-based electrolyte used in the rechargeable battery cell according to this disclosure comprises $SO_2$ not only as an additive in low concentration, but in concentrations at which the mobility of the ions of the first conducting salt, which is comprised in the electrolyte and causes the charge transport, is at least partially, largely or even completely ensured by the $SO_2$. The first conducting salt is dissolved in the electrolyte and shows very good solubility therein. It can form a liquid solvate complex with the gaseous $SO_2$, in which the $SO_2$ is bound. In this case, the vapor pressure of the liquid solvate complex is noticeably reduced compared to the pure $SO_2$, producing electrolytes that have a low vapor pressure. However, it is also within the scope of this disclosure that, depending on the chemical structure of the first conducting salt according to formula (I), no reduction in vapor pressure can occur in the production of the electrolyte according to this disclosure. In the last-mentioned case, it is preferred for the production of the electrolyte according to this disclosure to be carried out at low temperature or under pressure. The electrolyte may also comprise a plurality of conducting salts of the formula (I), which differ from one another in their chemical structure.

In the sense of this disclosure, the term "$C_1$-$C_{10}$ alkyl" includes linear or branched saturated hydrocarbon groups having one to ten carbon atoms. These include, in particular, methyl, ethyl, n-propyl, isopropyl, n-butyl, sec-butyl, isobutyl, tert-butyl, n-pentyl, iso-pentyl, 2,2-dimethylpropyl, n-hexyl, iso-hexyl, 2-ethylhexyl, n-heptyl, iso-heptyl, n-octyl, iso-octyl, n-nonyl, n-decyl and the like.

In the sense of this disclosure, the term "$C_2$-$C_{10}$ alkenyl" includes unsaturated linear or branched hydrocarbon groups having two to ten carbon atoms, wherein the hydrocarbon groups have at least one C—C double bond. These include, in particular, ethenyl, 1-propenyl, 2-propenyl, 1-n-butenyl, 2-n-butenyl, isobutenyl, 1-pentenyl, 1-hexenyl, 1-heptenyl, 1-octenyl, 1-nonenyl, 1-decenyl and the like.

In the sense of this disclosure, the term "$C_2$-$C_{10}$ alkynyl" includes unsaturated linear or branched hydrocarbon groups having two to ten carbon atoms, wherein the hydrocarbon groups have at least one C—C triple bond. This includes, in particular, ethynyl, 1-propynyl, 2-propynyl, 1-n-butynyl, 2-n-butynyl, isobutynyl, 1-pentynyl, 1-hexynyl, 1-heptynyl, 1-octynyl, 1-nonynyl, 1-decynyl, and the like.

In the sense of this disclosure, the term "$C_3$-$C_{10}$ cycloalkyl" includes cyclic, saturated hydrocarbon groups having three to ten carbon atoms. These include, in particular, cyclopropyl, cyclobutyl, cyclopentyl, cyclohexyl, cycloheptyl, cyclohexyl, cyclononyl and cyclodecanyl.

In the sense of this disclosure, the term "$C_6$-$C_{14}$ aryl" includes aromatic hydrocarbon groups having six to fourteen ring carbon atoms. This includes, in particular, phenyl ($C_6H_5$ group), naphthyl ($C_{10}H_7$ group) and anthracyl ($C_{14}H_9$ group).

In the sense of this disclosure, the term "$C_5$-$C_{14}$ heteroaryl" includes aromatic hydrocarbon groups having five to fourteen ring hydrocarbon atoms in which at least one hydrocarbon atom is replaced by a nitrogen, oxygen or sulfur atom. These include, in particular, pyrrolyl, furanyl, thiophenyl, pyrridinyl, pyranyl, thiopyranyl and the like. All of the hydrocarbon groups mentioned above are each bonded to the central atom according to formula (I) via the oxygen atom.

A rechargeable battery cell having such an electrolyte has the advantage over rechargeable battery cells having electrolytes known from the prior art in that the first conducting salt comprised therein has higher oxidation stability and consequently shows essentially no decomposition at higher cell voltages. Said electrolyte is resistant to oxidation, preferably at least up to an upper potential of 4.0 volts, more preferably at least up to an upper potential of 4.2 volts, more preferably at least up to an upper potential of 4.4 volts, more preferably at least up to an upper potential of 4.6 volts, more preferably at least up to an upper potential of 4.8 volts and most preferably at least up to an upper potential of 5.0 volts. Thus, when using such an electrolyte in a rechargeable battery cell, there is little or no electrolyte decomposition within the working potentials, that is, in the range between the end-of-charge voltage and the end-of-discharge voltage of both electrodes of the rechargeable battery cell. As a result, rechargeable battery cells according to this disclosure can have an end-of-charge voltage of at least 4.0 volts, more preferably of at least 4.4 volts, more preferably of at least 4.8 volts, more preferably of at least 5.2 volts, more preferably of at least 5.6 volts and most preferably of at least 6.0 volts.

The service life of the rechargeable battery cell comprising this electrolyte is significantly longer than that of rechargeable battery cells comprising electrolytes known from the prior art.

Furthermore, a rechargeable battery cell having such an electrolyte is also resistant to low temperatures. At a temperature of −40° C., for example, 61% of the charged capacity can still be discharged. The conductivity of the electrolyte at low temperatures is sufficient to operate a battery cell.

Furthermore, a rechargeable battery cell having such an electrolyte exhibits increased stability with respect to residual amounts of water. If there are still small residual amounts of water in the electrolyte (in the range of ppm), the electrolyte or the first conducting salt forms hydrolysis products with the water, which products, compared to the $SO_2$-based electrolytes known from the prior art, are significantly less aggressive towards the cell components. Because of this, the absence of water in the electrolyte plays a less important role in $SO_2$-based electrolytes in comparison to those known from the prior art. These advantages of the electrolyte according to this disclosure outweigh the disadvantage that arises from the fact that the first conducting salt according to formula (I) has a significantly larger anion size than the conducting salts known from the prior art. This higher anion size leads to a lower conductivity of the first conducting salt according to formula (I) compared to the conductivity of $LiAlCl_4$.

Negative Electrode

The active material of the negative electrode is metallic lithium. This means that lithium is also the active metal of the rechargeable battery. Said lithium is deposited on the discharge element of the negative electrode when the rechargeable battery cell is charged. This means that the negative electrode also comprises a discharge element in addition to the metallic lithium. This discharge element serves to enable the required electronically conductive connection of the active material of the negative electrode. For this purpose, the discharge element is in contact with the active material involved in the electrode reaction of the negative electrode. When the rechargeable battery cell is discharged, the metallic lithium is converted into lithium ions, wherein the lithium ions migrate from the negative electrode to the positive electrode. If the positive electrode is designed as an intercalation electrode, the lithium ions in the uncharged state of the battery cell are located at least partly in a host matrix of the active material of the positive intercalation electrode.

Advantageous developments of the rechargeable battery cell according to this disclosure with regard to the negative electrode are described below.

An advantageous development of the rechargeable battery cell according to this disclosure provides that the electronically conductive discharge element of the negative electrode is free of metallic lithium in the discharged state of the rechargeable battery cell. Metallic lithium is deposited on the electronically conductive discharge element of the negative electrode when charging the battery cell. The metallic lithium is essentially completely dissolved when discharging and enters the host matrix of the active material of the positive electrode in the form of ions.

A further advantageous development of the battery cell according to this disclosure provides that the electronically conductive discharge element of the negative electrode already comprises metallic lithium before the first charging of the rechargeable battery cell occurs. Further metallic lithium is deposited on the electronically conductive discharge element when the battery cell is charged. The metallic lithium is completely or only partially dissolved when discharging and enters the host matrix of the active material of the positive electrode in the form of ions. On the one hand, the metallic lithium, which is already located on the discharge element, can be applied to the discharge element before the battery cell is assembled, and can be built into the battery cell together with it. On the other hand, the metallic lithium can be deposited on the discharge element of the negative electrode before the battery cell is operated, that is, before the first charging and discharging by a preceding initialization charging process.

A further advantageous development of the battery cell according to this disclosure provides that the electronically conductive discharge element of the negative electrode is free of metallic lithium before the battery cell is charged for the first time. Metallic lithium is deposited on the electronically conductive discharge element when the battery cell is charged. The metallic lithium is completely or only partially dissolved when discharging and enters the host matrix of the active material of the positive electrode in the form of ions.

A further advantageous development of the battery cell according to this disclosure provides that the discharge element of the negative electrode is at least partially formed from a lithium-storing material. In such a development, when the battery cell is being charged, part of the lithium resulting from the electrode reaction is initially stored in the electronically conductive discharge element made of the lithium-storing material. As the battery cell continues to be charged, metallic lithium is then deposited on the electronically conductive discharge element. The metallic lithium is completely or only partially dissolved when discharging and enters the host matrix of the active material of the positive electrode in the form of ions.

The lithium-storing material can, for example, be the insertion material carbon, in particular in the form of the carbon allotrope graphite. It can also be a material which forms an alloy with lithium, such as lithium-storing metals and metal alloys (for example, Si, Ge, Sn, $SnCo_xC_y$, $SnSi_x$ and the like, here preferably silicon) or oxides of lithium-storing metals and metal alloys (for example, $SnO_x$, $SiO_x$, oxidic glasses of Sn, Si and the like) or a lithium intercalation material that does not comprise carbon, such as lithium titanates, in particular $Li_4Ti_5O_{12}$. Conversion materials such as transition metal oxides can also be used as lithium-storing materials.

A further advantageous development of the battery cell according to this disclosure provides that the discharge element of the negative electrode is designed as a planar discharge element in the form of a thin metal sheet or a thin metal foil. The thin metal foil preferably has a perforated or mesh-like structure. The planar discharge element can also consist of a plastic film coated with metal. Said metal coatings have a thickness in the range from 0.1 μm to 20 μm. The active material of the negative electrode is preferably applied to the surface of the thin metal sheet, the thin metal foil or the metal-coated plastic foil. The active material can be applied to the front and/or the rear side of the planar discharge element. Such planar discharge elements have a thickness in the range from 5 μm to 50 μm. A thickness of the planar discharge element in the range from 10 μm to 30 μm is preferred. When using planar discharge elements, the negative electrode can have a total thickness of at least 20 μm, preferably at least 40 μm and particularly preferably at least 60 μm. The maximum thickness is at most 200 μm, preferably at most 150 µm and particularly preferably at most 100 µm. The area-specific capacity of the negative electrode based on the coating on one side is preferably at least 0.5 mAh/cm$^2$ when using a planar discharge element in the charged state of the battery cell, wherein the following values are further preferred in this order: 1 mAh/cm$^2$, 3 mAh/cm$^2$, 5 mAh/cm$^2$, 10 µmAh/cm$^2$, 15 mAh/cm$^2$, 20 µmAh/cm$^2$, 25 mAh/cm$^2$.

Furthermore, there is also the possibility for the discharge element of the negative electrode to be designed three-dimensionally in the form of a porous metal structure, in particular in the form of a metal foam. The term "three-dimensional porous metal structure" refers to any structure consisting of metal that not only extends over the length and width of the flat electrode like the thin metal sheet or the metal foil, but also over its thickness dimension. The three-dimensional porous metal structure is sufficiently porous such that the active material of the negative electrode, that is, metallic lithium, can be deposited into the pores of the metal structure. The amount of active material deposited is the loading on the negative electrode. When the discharge element is designed three-dimensionally in the form of a porous metal structure, in particular in the form of a metal foam, then the negative electrode preferably has a thickness of at least 0.2 mm, more preferably at least 0.3 mm, more preferably at least 0.4 mm, more preferably at least 0.5 mm and most preferably at least 0.6 mm. In this case, the thickness of the electrodes is significantly greater compared to negative electrodes used in organic lithium cells. A further advantageous embodiment provides that the area-specific capacity of the negative electrode in the charged state of the battery cell when using a three-dimensional discharge element, in particular in the form of a metal foam, is preferably at least 2.5 mAh/cm$^2$, wherein the following values are further preferred in this order: 5 mAh/cm$^2$, 15 mAh/cm$^2$, 25 mAh/cm$^2$, 35 mAh/cm$^2$, 45 mAh/cm$^2$.

A further advantageous development of the battery cell according to this disclosure provides that the discharge element includes a binder. Said binder is preferably a fluorinated binder, in particular a polyvinylidene fluoride and/or a terpolymer which is formed from tetrafluoroethylene, hexafluoropropylene and vinylidene fluoride. However, it can also be a binder which consists of a polymer which is composed of monomeric structural units of a conjugated carboxylic acid or of the alkali, alkaline earth or ammonium salt of this conjugated carboxylic acid or of a combination thereof. Furthermore, the binder can also consist of a polymer based on monomeric styrene and butadiene structural units. In addition, the binder can also be a binder from the group of carboxymethyl celluloses. The binder is present in the negative electrode, preferably in a concentration of at most 20% by weight, more preferably at most 15% by weight, more preferably at most 10% by weight, more preferably at most 7% by weight, more preferably at most 5% by weight and most preferably at most 2% by weight based on the total weight of the negative electrode.

Electrolyte

Advantageous developments of the rechargeable battery cell with regard to the SO$_2$-based electrolyte are described below.

In a further advantageous embodiment of the rechargeable battery cells, the substituents $R^1$, $R^2$, $R^3$ and $R^4$ of the first conducting salt are selected independently of one another from the group formed by:

$C_1$-$C_6$ alkyl; preferably from $C_2$-$C_4$ alkyl; particularly preferably from the alkyl groups 2-propyl, methyl and ethyl;

$C_2$-$C_6$ alkenyl; preferably from $C_2$-$C_4$ alkenyl; particularly preferably from the alkenyl groups ethenyl and propenyl;

$C_2$-$C_6$ alkynyl; preferably from $C_2$-$C_4$ alkynyl;

$C_3$-$C_6$ cycloalkyl;

phenyl; and $C_5$-$C_7$ heteroaryl.

In the case of this advantageous embodiment of the SO$_2$-based electrolyte, the term "$C_1$-$C_6$ alkyl" includes linear or branched saturated hydrocarbon groups having one to six hydrocarbon groups, in particular methyl, ethyl, n-propyl, isopropyl, n-butyl, sec-butyl, iso-butyl, tert-butyl, n-pentyl, iso-pentyl, 2,2-dimethylpropyl, n-hexyl and iso-hexyl. $C_2$-$C_4$ alkyls are preferred among these. The $C_2$-$C_4$ alkyls 2-propyl, methyl and ethyl are particularly preferred.

In the case of this advantageous embodiment of the SO$_2$-based electrolyte, the term "$C_2$-$C_6$ alkenyl" includes unsaturated linear or branched hydrocarbon groups having two to six carbon atoms, wherein the hydrocarbon groups have at least one C—C double bond. These include in particular ethenyl, 1-propenyl, 2-propenyl, 1-n-butenyl, 2-n-butenyl, isobutenyl, 1-pentenyl and 1-hexenyl, wherein $C_2$-$C_4$ alkenyls are preferred. Ethenyl and 1-propenyl are particularly preferred.

In the case of this advantageous embodiment of the SO$_2$-based electrolyte, the term "$C_2$-$C_6$ alkynyl" includes unsaturated linear or branched hydrocarbon groups having two to six carbon atoms, wherein the hydrocarbon groups have at least one C—C triple bond. These include in particular ethynyl, 1-propynyl, 2-propynyl, 1-n-butynyl, 2-n-butynyl, iso-butynyl, 1-pentynyl and 1-hexynyl. Preferred among these are $C_2$-$C_4$ alkynyls.

In the case of this advantageous embodiment of the SO$_2$-based electrolyte, the term "$C_3$-$C_6$ cycloalkyl" includes cyclic saturated hydrocarbon groups having three to six carbon atoms. These include in particular cyclopropyl, cyclobutyl, cyclopentyl and cyclohexyl.

In the case of this advantageous embodiment of the SO$_2$-based electrolyte, the term "$C_5$-$C_7$ heteroaryl" includes phenyl and naphthyl.

To improve the solubility of the first conducting salt in the SO$_2$-based electrolytes, the substituents $R^1$, $R^2$, $R^3$ and $R^4$ are substituted, in a further advantageous embodiment of the rechargeable battery cell, by at least one fluorine atom and/or by at least one chemical group, wherein the chemical group is selected from the group formed by $C_1$-$C_4$ alkyl, $C_2$-$C_4$ alkenyl, $C_2$-$C_4$ alkynyl, phenyl and benzyl. The chemical groups $C_1$-$C_4$ alkyl, $C_2$-$C_4$ alkenyl, $C_2$-$C_4$ alkynyl, phenyl and benzyl have the same properties or chemical structures as the hydrocarbon groups described above. Substituted in this context means that individual atoms or groups of atoms of the substituents $R^1$, $R^2$, $R^3$ and $R^4$ have been replaced by the fluorine atom and/or by the chemical group.

A particularly high solubility of the first conducting salt in the SO$_2$-based electrolytes can be achieved by at least one of the substituents $R^1$, $R^2$, $R^3$ and $R^4$ being a CF$_3$ group or an OSO$_2$CF$_3$ group.

In a further advantageous development of the rechargeable battery cell, the first conducting salt is selected from the group formed by:

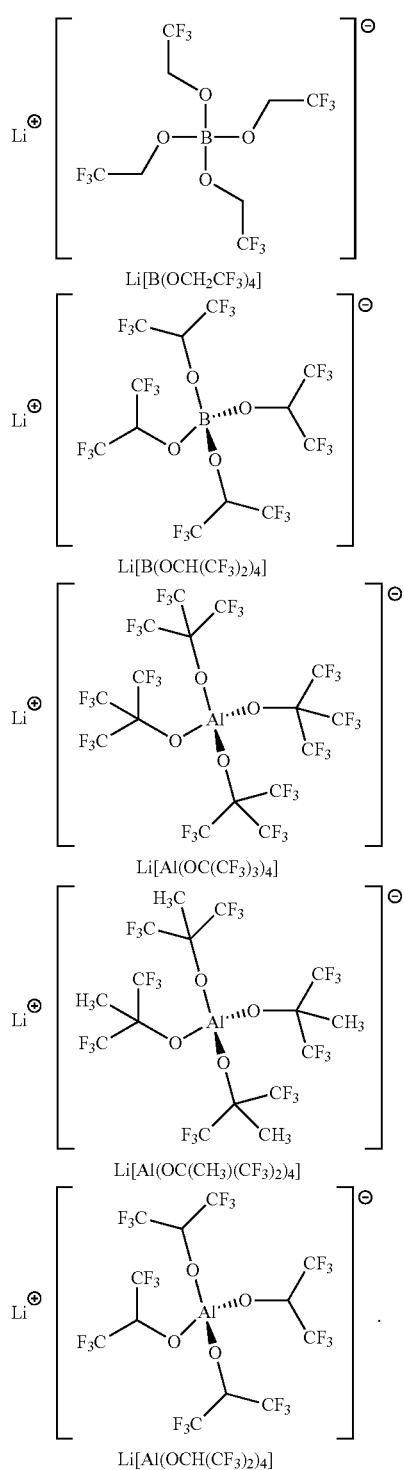

In order to adjust the conductivity and/or other properties of the electrolyte to a desired value, the electrolyte in a further advantageous embodiment of the rechargeable battery cell according to this disclosure has at least one second conducting salt different from the first conducting salt according to formula (I). This means that, in addition to the first conducting salt, the electrolyte can comprise a or even further second conducting salts which differ from the first conducting salt in their chemical composition and their chemical structure.

In a further advantageous embodiment of the rechargeable battery cell according to this disclosure, the second conducting salt is an alkali metal compound, in particular a lithium compound. The alkali metal compound or the lithium compound are selected from the group formed by an aluminate, a halide, an oxalate, a borate, a phosphate, an arsenate and a gallate. The second conducting salt is preferably a lithium tetrahaloaluminate, in particular $LiAlCl_4$.

Furthermore, in a further advantageous embodiment of the rechargeable battery cell according to this disclosure, the electrolyte comprises at least one additive. This additive is preferably selected from the group formed by vinylene carbonate and its derivatives, vinylethylene carbonate and its derivatives, methylethylene carbonate and its derivatives, lithium (bisoxalato)borate, lithium difluoro(oxalato)borate, lithium tetrafluoro(oxalato)phosphate, lithium oxalate, 2-vinylpyridine, 4-vinylpyridine, cyclic exomethylene carbonates, sultones, cyclic and acyclic sulfonates, acyclic sulfites, cyclic and acyclic sulfinates, organic esters of inorganic acids, acyclic and cyclic alkanes, which acyclic and cyclic alkanes have a boiling point of at least 36° C. at 1 bar, aromatic compounds, halogenated cyclic and acyclic sulfonylimides, halogenated cyclic and acyclic phosphate esters, halogenated cyclic and acyclic phosphines, halogenated cyclic and acyclic phosphites, halogenated cyclic and acyclic phosphazenes, halogenated cyclic and acyclic silylamines, halogenated cyclic and acyclic halogenated esters, halogenated cyclic and acyclic amides, halogenated cyclic and acyclic anhydrides and halogenated organic heterocycles.

In relation to the total weight of the electrolyte composition, the electrolyte has the following composition in a further advantageous development of the rechargeable battery cell:
(i) 5 to 99.4% by weight sulfur dioxide,
(ii) 0.6 to 95% by weight of the first conducting salt,
(iii) 0 to 25% by weight of the second conducting salt and
(iv) 0 to 10% by weight of the additive.

As already mentioned above, the electrolyte can comprise not only a first conducting salt according to formula (I) and a second conducting salt, but also a plurality of first conducting salts according to formula (I) and a plurality of second conducting salts. In the last-mentioned case, the aforementioned percentages also include a plurality of first conducting salts and a plurality of second conducting salts. The molar concentration of the first conducting salt lies in the range from 0.01 mol/L to 10 µmol/L, preferably from 0.05 mol/L to 10 µmol/L, more preferably from 0.1 mol/L to 6 mol/L and most preferably from 0.2 mol/L to 3.5 mol/L, based on the total volume of the electrolyte.

A further advantageous development of the rechargeable battery cell according to this disclosure provides that the electrolyte comprises at least 0.1 mol $SO_2$, preferably at least 1 mol $SO_2$, more preferably at least 5 mol $SO_2$, more preferably at least 10 µmol $SO_2$ and most preferably at least 20 µmol $SO_2$ per mole of conducting salt. The electrolyte can also comprise very high molar proportions of $SO_2$, wherein the preferred upper limit value is 2600 µmol $SO_2$ per mole of conducting salt and upper limits of 1500, 1000, 500 and 100 mol of $SO_2$ per mole of conducting salt are further preferred in this order. The term "per mole of conducting salt" refers to all conducting salts that are comprised in the electrolyte. Electrolytes based on $SO_2$ having such a concentration ratio between $SO_2$ and the conducting salt have the advantage in that they can dissolve a larger amount of conducting salt compared to the electrolytes known from the prior art, which are based, for example, on an organic solvent blend. In the context of this disclosure, it was found that, surprisingly, an electrolyte having a relatively low concentration of conducting salt is advantageous despite the associated higher vapor pressure, in particular with regard to its stability over many charge and discharge cycles of the rechargeable battery cell. The concentration of $SO_2$ in the electrolyte affects its conductivity. Thus, by choosing the $SO_2$ concentration, the conductivity of the electrolyte can be adjusted to the planned use of a rechargeable battery cell operated using this electrolyte.

The total content of $SO_2$ and the first conducting salt can be greater than 50 percent by weight (% by weight) of the weight of the electrolyte, preferably greater than 60% by weight, more preferably greater than 70% by weight, more preferably greater than 80% by weight, more preferably greater than 85% by weight, more preferably greater than 90% by weight, more preferably greater than 95% by weight or most preferably greater than 99% by weight.

The electrolyte can comprise at least 5% by weight $SO_2$ based on the total amount of the electrolyte comprised in the rechargeable battery cell, wherein values of 20% by weight $SO_2$, 40% by weight $SO_2$ and 60% by weight $SO_2$ are more preferred. The electrolyte can also comprise up to 95% by weight $SO_2$, wherein maximum values of 80% by weight $SO_2$ and 90% by weight $SO_2$ are preferred in this order.

It is within the scope of this disclosure for the electrolyte to preferably have only a small percentage or even no percentage of at least one organic solvent. The proportion of organic solvents in the electrolyte, which is present, for example, in the form of one solvent or a blend of a plurality of solvents, can preferably be at most 50% by weight of the weight of the electrolyte. Lower proportions of at most 40% by weight, at most 30% by weight, at most 20% by weight, at most 15% by weight, at most 10% by weight, at most 5% by weight or at most 1% by weight of the electrolyte weight are particularly preferred. More preferably, the electrolyte is free of organic solvents. Due to the low proportion of organic solvents or even their complete absence, the electrolyte is either hardly combustible or not at all combustible. This increases the operational safety of a rechargeable battery cell operated using such an $SO_2$-based electrolyte. The $SO_2$-based electrolyte is particularly preferably essentially free of organic solvents.

In relation to the total weight of the electrolyte composition, the electrolyte has the following composition in a further advantageous development of the rechargeable battery cell:
  (i) 5 to 99.4% by weight sulfur dioxide,
  (ii) 0.6 to 95% by weight of the first conducting salt,
  (iii) 0 to 25% by weight of the second conducting salt,
  (iv) 0 to 10% by weight of the additive and
  (v) 0 to 50% by weight of an organic solvent.

Positive Electrode

Advantageous developments of the rechargeable battery cell according to this disclosure with regard to the positive electrode are described below.

An advantageous development of the rechargeable battery cell according to this disclosure provides that the positive electrode can be charged at least up to an upper potential of 4.0 volts, preferably up to a potential of 4.4 volts, more preferably of at least a potential of 4.8 volts, more preferably at least up to a potential of 5.2 volts, more preferably at least up to a potential of 5.6 volts and most preferably at least up to a potential of 6.0 volts.

In a further advantageous development of the rechargeable battery cell according to this disclosure, the positive electrode comprises at least one active material. Said material can store ions of the active metal and release and take up the ions of the active metal during operation of the battery cell.

In a further advantageous development of the rechargeable battery cell according to this disclosure, the positive electrode comprises at least one intercalation compound. In the sense of this disclosure, the term "intercalation compound" refers to a sub-category of the insertion materials described above. Said intercalation compound acts as a host matrix, which has vacancies that are interconnected. The ions of the active metal can diffuse into these vacancies during the discharge process of the rechargeable battery cell and can be stored there. During the deposition of the ions of the active metal, only minor or no structural changes occur in the host matrix.

In a further advantageous development of the rechargeable battery cell according to this disclosure, the positive electrode comprises at least one conversion compound as the active material. In the sense of this disclosure, the term "conversion compounds" refers to materials which form other materials during electrochemical activity; that is, chemical bonds are broken and re-established during charging and discharging of the battery cell. Structural changes occur in the matrix of the conversion compound during the absorption or release of the ions of the active metal.

In a further advantageous development of the rechargeable battery cell according to this disclosure, the active material has the composition $Li_xM'_yM''_zO_a$, wherein:
  M' is at least one metal selected from the group formed by the elements Ti, V, Cr, Mn, Fe, Co, Ni, Cu and Zn;
  M" is at least one element selected from the group formed by the elements of groups 2, 3, 4, 5, 6, 7, 8, 9, 10, 11, 12, 13, 14, 15 and 16 of the periodic table of the elements;
  x and y independently of one another are numbers greater than 0;
  z is a number greater than or equal to 0; and
  a is a number greater than 0.

The indices y and z in the composition $Li_xM'_yM''_zO_a$ relate to the totality of metals and elements that are represented by M' and M", respectively. If, for example, M' comprises two metals $M'^1$ and $M'^2$, the following applies to the index y: y=y1+y2, wherein y1 and y2 represent the indices of the metals $M'^1$ and $M'^2$. The indices x, y, z and a must be chosen such that there is charge neutrality within the composition. Examples of compounds in which M' comprises two metals are lithium nickel manganese cobalt oxides of the composition $Li_xNi_{y1}Mn_{y2}Co_zO_2$ with $M'^1$=Ni, $M'^2$=Mn and M"=Co. Examples of compounds in which z=0, that is, which have no further metal or element M", are lithium cobalt oxides $Li_xCo_yO_a$.

For example, if M" comprises two elements, on the one hand, a metal $M''^1$ and on the other hand, phosphorus as $M''^2$, the following applies to the index z: z=z1+z2, wherein z1 and z2 represent the indices of the metal $M''^1$ and of phosphorus ($M''^2$). The indices x, y, z and a must be chosen such that there is charge neutrality within the composition. Examples of compounds in which M" comprises a metal $M''^1$ and phosphorus as $M''^2$ are lithium iron manganese phosphates $Li_xFe_yMn_{z1}P_{z2}O_4$ with M'=Fe, $M''^1$=Mn and $M''^2$=P and z2=1. In a further composition, M" can comprise two non-metals, for example, fluorine as $M''^1$ and sulfur as $M''^2$. Examples of such compounds are lithium iron fluorosulfates $Li_xFe_yF_{z1}S_{z2}O_4$ with M'=Fe, $M''^1$=F and $M''^2$=P.

A further advantageous development of the rechargeable battery cell according to this disclosure provides that M' consists of the metals nickel and manganese and M" is cobalt. These can be compositions of the formula $Li_xNi_{y1}Mn_{y2}Co_zO_2$ (NMC), that is, lithium nickel manganese cobalt oxide having the structure of layered oxides. Examples of these lithium nickel manganese cobalt oxide active materials are $LiNi_{1/3}Mn_{1/3}Co_{1/3}O_2$ (NMC111), $LiNi_{0.6}Mn_{0.2}Co_{0.2}O_2$ (NMC622) and $LiNi_{0.8}Mn_{0.1}Co_{0.1}O_2$ (NMC811). Further compounds of lithium nickel manganese cobalt oxide can have the composition $LiNi_{0.5}Mn_{0.3}Co_{0.2}O_2$, $LiNi_{0.5}Mn_{0.25}Co_{0.25}O_2$, $LiNi_{0.52}Mn_{0.32}Co_{0.16}O_2$, $LiNi_{0.55}Mn_{0.30}Co_{0.15}O_2$, $LiNi_{0.58}Mn_{0.14}Co_{0.28}O_2$, $LiNi_{0.64}Mn_{0.18}Co_{0.18}O_2$, $LiNi_{0.65}Mn_{0.27}Co_{0.08}O_2$, $LiNi_{0.7}Mn_{0.2}Co_{0.1}O_2$, $LiNi_{0.7}Mn_{0.15}Co_{0.15}O_2$, $LiNi_{0.72}Mn_{0.10}Co_{0.18}O_2$, $LiNi_{0.76}Mn_{0.14}Co_{0.10}O_2$, $LiNi_{0.86}Mn_{0.04}Co_{0.10}O_2$, $LiNi_{0.90}Mn_{0.05}Co_{0.05}O_2$, $LiNi_{0.95}Mn_{0.025}Co_{0.025}O_2$ or a combination thereof. Positive electrodes for rechargeable battery cells having a cell voltage of over 4.6 volts can be produced using these compounds.

A further advantageous development of the rechargeable battery cell according to this disclosure provides that the active material is a metal oxide which is rich in lithium and manganese (lithium and manganese-rich oxide material). These materials can be described with the following formulas: $Li_xMn_yM''_zO_a$. M' of the formula $Li_xM'_yM''_zO_a$ described above thus represents the metal manganese (Mn). The index x here is greater than or equal to 1, the index y is greater than the index z or greater than the sum of the indices z1+z2+z3 etc. For example, if M" comprises two metals $M''^1$ and $M''^2$ with the indices z1 and z2 (for example, $Li_{1.2}Mn_{0.525}Ni_{0.175}Co_{0.1}O_2$ with $M''^1$=Ni z1=0.175 and $M''^2$=Co z2=0.1), the following applies for the index y: y>z1+z2, The index z is greater than or equal to 0 and the index a is greater than 0. The indices x, y, z and a must be chosen such that there is charge neutrality within the composition. Metal oxides which are rich in lithium and manganese can also be described by the formula $mLi_2MnO_3$ $(1-m)LiM'O_2$ with 0<m<1. Examples of such compounds are $Li_{1.2}Mn_{0.525}Ni_{0.175}Co_{0.1}O_2$, $Li_{1.2}Mn_{0.6}Ni_{0.2}O_2$ or $Li_{1.2}Ni_{0.13}Co_{0.13}Mn_{0.54}O_2$.

A further advantageous development of the rechargeable battery cell according to this disclosure provides that the composition has the formula $Li_xM'_yM''_zO_4$. These compounds are spinel structures. For example, M' can be cobalt, and M" manganese. In this case, the active material is lithium cobalt manganese oxide ($LiCoMnO_4$). $LiCoMnO_4$ can be used to produce positive electrodes for rechargeable battery cells having a cell voltage of over 4.6 volts. This $LiCoMnO_4$ is preferably free of $Mn^{3+}$. In a further example, M' can be nickel and M" can be manganese. In this case, the active material is lithium nickel manganese oxide (LiNiMnO$_4$). The molar proportions of the two metals M' and M" can vary. Lithium nickel manganese oxide can, for example, have the composition $LiNi_{0.5}Mn_{1.5}O_4$.

In a further advantageous development of the rechargeable battery cell according to this disclosure, the positive electrode comprises at least one active material which constitutes a conversion compound. Conversion compounds undergo a solid-state redox reaction during the absorption of the active metal, for example, lithium or sodium, in which the crystal structure of the material changes. This occurs by breaking and recombining chemical bonds. Completely reversible reactions of conversion compounds can be, for example, as follows:

Type A

Type B

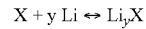

Examples of conversion compounds are $FeF_2$, $FeF_3$, $CoF_2$, $CuF_2$, $NiF_2$, $BiF_3$, $FeCl_3$, $FeCl_2$, $CoCl_2$, $NiCl_2$, $CuCl_2$, AgCl, LiCl, S, $Li_2S$, Se, $Li_2Se$, Te, I and LiI.

In a further advantageous development of the battery cell according to this disclosure, the compound has the composition $Li_xM'_yM''^1_{z1}M''^2_{z2}O_4$, wherein $M''^2$ is phosphorus and z2 has the value 1. The compound having the composition $Li_xM'_yM''^1_{z1}M''^2_{z2}O_4$ is a lithium metal phosphate. In particular, this compound has the composition $Li_xFe_yMn_{z1}P_{z2}O_4$.

Examples of lithium metal phosphates are lithium iron phosphate ($LiFePO_4$) or lithium iron manganese phosphates ($Li(Fe_yMn_z)PO_4$). An example of a lithium iron manganese phosphate is the phosphate of the composition $Li(Fe_{0.3}Mn_{0.7})PO_4$.

Lithium metal phosphates of other compositions can also be used for the battery cell according to this disclosure.

A further advantageous development of the rechargeable battery cell according to this disclosure provides that the positive electrode comprises at least one metal compound. This metal compound is selected from the group that is formed by a metal oxide, a metal halide and a metal phosphate. The metal of this metal compound is preferably a transition metal of the atomic numbers 22 to 28 of the periodic table of the elements, in particular cobalt, nickel, manganese or iron.

A further advantageous development of the rechargeable battery cell according to this disclosure provides that the positive electrode comprises at least one metal compound which has the chemical structure of a spinel, a layered oxide, a conversion compound or a polyanionic compound.

It is within the scope of this disclosure for the positive electrode to comprise at least one of the compounds described or a combination of the compounds as the active material. A combination of the compounds refers to a positive electrode which comprises at least two of the materials described.

A further advantageous development of the battery cell according to this disclosure provides that the positive electrode has a discharge element. This means that the positive electrode also comprises a discharge element in addition to the active material. Said discharge element serves to enable the required electronically conductive connection of the active material of the positive electrode. For this purpose, the discharge element is in contact with the active material involved in the electrode reaction of the positive electrode.

Said discharge element can be designed in a planar manner in the form of a thin metal sheet or a thin metal foil. The thin metal foil preferably has a perforated or mesh-like structure. The planar discharge element can also consist of a plastic film coated with metal. Said metal coatings have a thickness in the range from 0.1 µm to 20 µm. The active material of the positive electrode is preferably applied to the surface of the thin metal sheet, the thin metal foil or the metal-coated plastic foil. The active material can be applied to the front and/or the rear side of the planar discharge element. Such planar discharge elements have a thickness in the range from 5 m to 50 µm. A thickness of the planar discharge element in the range from 10 µm to 30 µm is preferred. When using planar discharge elements, the positive electrode can have a total thickness of at least 20 µm, preferably at least 40 µm and particularly preferably at least 60 µm. The maximum thickness is at most 200 µm, preferably at most 150 µm and particularly preferably at most 100 µm. The area-specific capacity of the positive electrode based on the coating on one side is preferably at least 0.5 mAh/cm$^2$ when using a planar discharge element, wherein the following values are further preferred in this order: 1 mAh/cm$^2$, 3 mAh/cm$^2$, 5 mAh/cm$^2$, 10 µmAh/cm$^2$, 15 mAh/cm$^2$, 20 µmAh/cm$^2$.

Furthermore, there is also the possibility for the discharge element of the positive electrode to be designed three-dimensionally in the form of a porous metal structure, in particular in the form of a metal foam. The three-dimensional porous metal structure is sufficiently porous such that the active material of the positive electrode can be incorporated into the pores of the metal structure. The amount of active material incorporated or applied is the loading on the positive electrode. When the discharge element is designed three-dimensionally in the form of a porous metal structure, in particular in the form of a metal foam, then the positive electrode preferably has a thickness of at least 0.2 mm, more preferably at least 0.3 mm, more preferably at least 0.4 mm, more preferably at least 0.5 mm and most preferably at least 0.6 mm. A further advantageous embodiment provides that the area-specific capacity of the positive electrode when using a three-dimensional discharge element, in particular in the form of a metal foam, is preferably at least 2.5 mAh/cm$^2$, wherein the following values are further preferred in this order: 5 mAh/cm$^2$, 15 mAh/cm$^2$, 25 mAh/cm$^2$, 35 mAh/cm$^2$, 45 mAh/cm$^2$, 55 mAh/cm$^2$, 65 mAh/cm$^2$, 75 mAh/cm$^2$. When the discharge element is designed three-dimensionally in the form of a porous metal structure, in particular in the form of a metal foam, the amount of active material of the positive electrode, that is, the loading of the electrode, based on its area, is at least 10 µmg/cm$^2$, preferably at least 20 µmg/cm$^2$, more preferably at least 40 µmg/cm$^2$, more preferably at least 60 µmg/cm$^2$, more preferably at least 80 µmg/cm$^2$ and most preferably at least 100 µmg/cm$^2$. This loading of the positive electrode has a positive effect on the charging process and the discharging process of the rechargeable battery cell.

In a further advantageous development of the battery cell according to this disclosure, the positive electrode has at least one binder. Said binder is preferably a fluorinated binder, in particular a polyvinylidene fluoride and/or a terpolymer which is formed from tetrafluoroethylene, hexafluoropropylene and vinylidene fluoride. However, it can also be a binder which consists of a polymer which is composed of monomeric structural units of a conjugated carboxylic acid or of the alkali, alkaline earth or ammonium salt of this conjugated carboxylic acid or of a combination thereof. Furthermore, the binder can also consist of a polymer based on monomeric styrene and butadiene structural units. In addition, the binder can also be a binder from the group of carboxymethyl celluloses. The binder is present in the positive electrode, preferably in a concentration of at most 20% by weight, more preferably at most 15% by weight, more preferably at most 10% by weight, more preferably at most 7% by weight, more preferably at most 5% by weight and most preferably at most 2% by weight based on the total weight of the positive electrode.

Structure of the Rechargeable Battery Cell

Advantageous developments of the rechargeable battery cell according to this disclosure are described below with regard to their structure.

In order to further improve the function of the rechargeable battery cell, a further advantageous development of the rechargeable battery cell according to this disclosure provides that the rechargeable battery cell comprises a plurality of negative electrodes and a plurality of positive electrodes, which are stacked alternately in the housing. Here, the positive electrodes and the negative electrodes are preferably each electrically separated from one another by separators.

The separator can be formed from a non-woven material, a membrane, a woven material, a knitted material, an organic material, an inorganic material or a combination thereof. Organic separators can consist of unsubstituted polyolefins (for example, polypropylene or polyethylene), partially to completely halogen-substituted polyolefins (for example, partially to completely fluorine-substituted, in particular PVDF, ETFE, PTFE), polyesters, polyamides or polysulfones. Separators that comprise a combination of organic and inorganic materials are, for example, glass fiber textile materials in which the glass fibers are provided with a suitable polymer coating. The coating preferably comprises a fluorine-containing polymer such as polytetrafluoroethylene (PTFE), ethylene-tetrafluoroethylene (ETFE), perfluoroethylene propylene (FEP), THV (terpolymer of tetrafluoroethylene, hexafluoroethylene and vinylidene fluoride), a perfluoroalkoxy polymer (PFA), aminosilane, polypropylene or polyethylene (PE). The separator can also be folded in the housing of the rechargeable battery cell, for example, in the form of so-called "Z-folding." In this Z-folding, a strip-shaped separator is folded in a Z-like manner through or around the electrodes. Furthermore, the separator can also be formed as separator paper.

It is also within the scope of this disclosure for the separator to be able to be designed as a sheath, wherein each positive electrode or each negative electrode is enveloped by the sheath. The sheath can be formed from a non-woven material, a membrane, a woven material, a knitted material, an organic material, an inorganic material or a combination thereof.

A sheath on the positive electrode leads to more uniform ion migration and ion distribution in the rechargeable battery cell. The more even the ion distribution, in particular in the negative electrode, the higher the possible loading of the negative electrode with active material and, as a result, the usable capacity of the rechargeable battery cell. At the same time, risks are avoided that could be associated with uneven loading and the resulting deposition of the active metal. These advantages are particularly effective when the positive electrodes of the rechargeable battery cell are enveloped in the sheath.

The surface dimensions of the electrodes and the sheath can preferably be matched to one another such that the external dimensions of the sheath of the electrodes and the external dimensions of the unsheathed electrodes match at least in one dimension.

The surface area of the sheath can preferably be greater than the surface area of the electrode. In this case, the sheath extends beyond a boundary of the electrode. Two layers of the sheath covering the electrode on both sides can therefore be connected to one another at the edge of the positive electrode by an edge connection.

In a further advantageous embodiment of the rechargeable battery cell according to this disclosure, the negative electrodes have a sheath, while the positive electrodes have no sheath.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
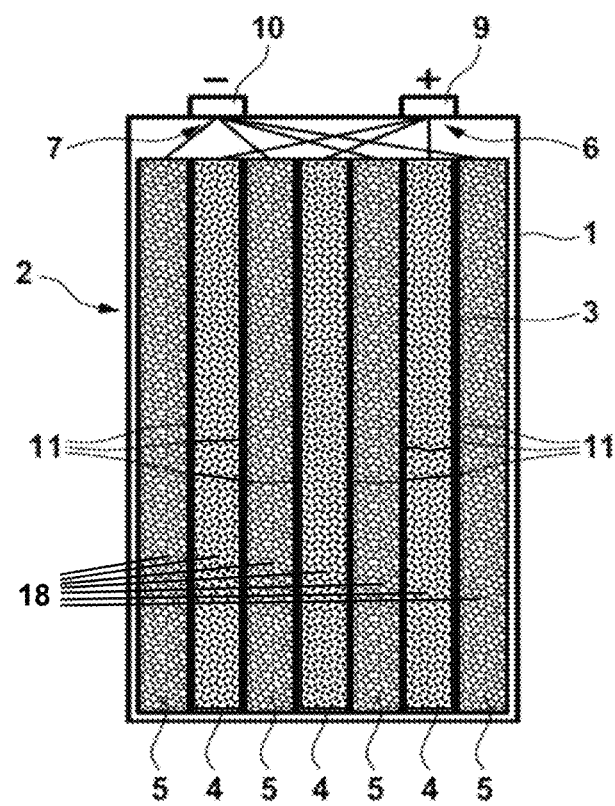
FIG. 1 shows a first embodiment of a rechargeable battery cell according to this disclosure in a cross-sectional illustration.

FIG. 1 shows a first embodiment of a rechargeable battery cell 2 according to this disclosure in a cross-sectional illustration. Said rechargeable battery cell 2 is designed as a prismatic cell and has a housing 1, among other things. Said housing 1 encloses an electrode array 3 which comprises three positive electrodes 4 and four negative electrodes 5. The positive electrodes 4 and the negative electrodes 5 are stacked alternately in the electrode array 3. The housing 1 can, however, also accommodate more positive electrodes 4 and/or negative electrodes 5. In general, it is preferred when the number of negative electrodes 5 is one greater than the number of positive electrodes 4. This has the consequence of the outer end faces of the electrode stack being formed by the electrode surfaces of the negative electrodes 5. The electrodes 4, 5 are connected to corresponding contacts 9, 10 of the rechargeable battery cell 2 via electrode connections 6, 7. The rechargeable battery cell 2 is filled with an SO$_2$-based electrolyte such that the electrolyte penetrates as completely as possible into all pores or cavities, in particular within the electrodes 4, 5. The electrolyte is not visible in FIG. 1. In the present embodiment, the positive electrodes 4 comprise an intercalation compound as an active material. This intercalation compound is LiCoMnO$_4$.

The electrodes 4, 5 are designed flat in the present embodiment, that is, as layers having a thickness that is smaller in relation to their surface area. They are each separated from one another by separators 11. The housing 1 of the rechargeable battery cell 2 is essentially designed as a rectangular parallelepiped, wherein the electrodes 4, 5 and the walls of the housing 1 shown in a sectional illustration extend perpendicular to the plane of the drawing and are essentially straight and flat. The rechargeable battery cell 2 can, however, also be designed as a winding cell in which the electrodes consist of thin layers that are wound up together with a separator material. The separators 11, on the one hand, separate the positive electrode 4 and the negative electrode 5 spatially and electrically and, on the other hand, are permeable to the ions of the active metal, among other things. In this way, large electrochemically effective surfaces are created, which enable a correspondingly high current yield.

The electrodes 4, 5 also have a discharge element which serves to enable the required electronically conductive connection of the active material of the respective electrode. Said discharge element is in contact with the active material involved in the electrode reaction of the respective electrode 4, 5 (not depicted in FIG. 1). The discharge element is designed in the form of a porous metal foam 18. The metal foam 18 extends over the thickness dimension of the electrodes 4, 5. The active material of the positive electrodes 4 and the negative electrodes 5 is incorporated into the pores of said metal foam 18 so that it fills its pores uniformly over the entire thickness of the metal structure. The positive electrodes 4 comprise a binder to improve the mechanical strength. This binder is a fluoropolymer. The negative electrodes 5 comprise lithium as an active material.

Figure 2:
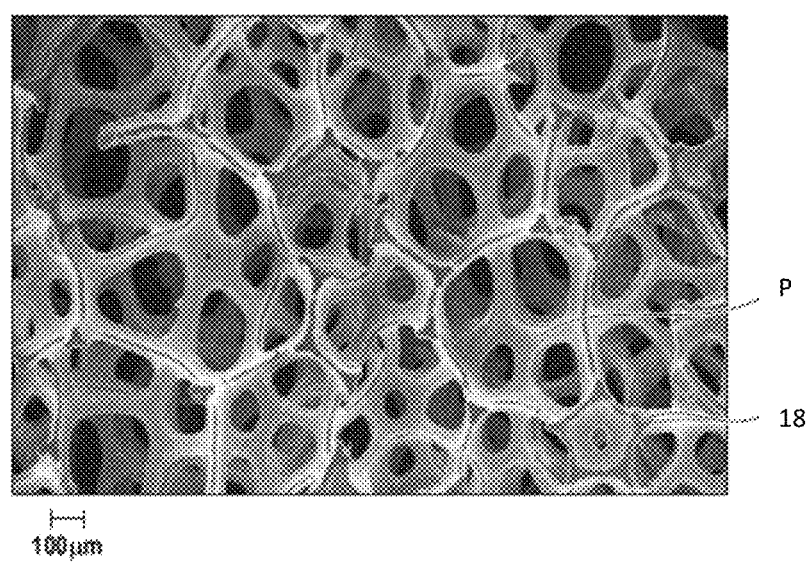
FIG. 2 shows an electron microscope image of the three-dimensional porous structure of the metal foam of the first embodiment from FIG. 1 as a detailed illustration.

FIG. 2 shows an electron microscope image of the three-dimensional porous structure of the metal foam 18 of the first embodiment from FIG. 1. On the basis of the specified scale, it can be seen that the pores P have an average diameter of more than 100 μm, that is, are relatively large. This metal foam is a metal foam made of nickel.

Figure 3:
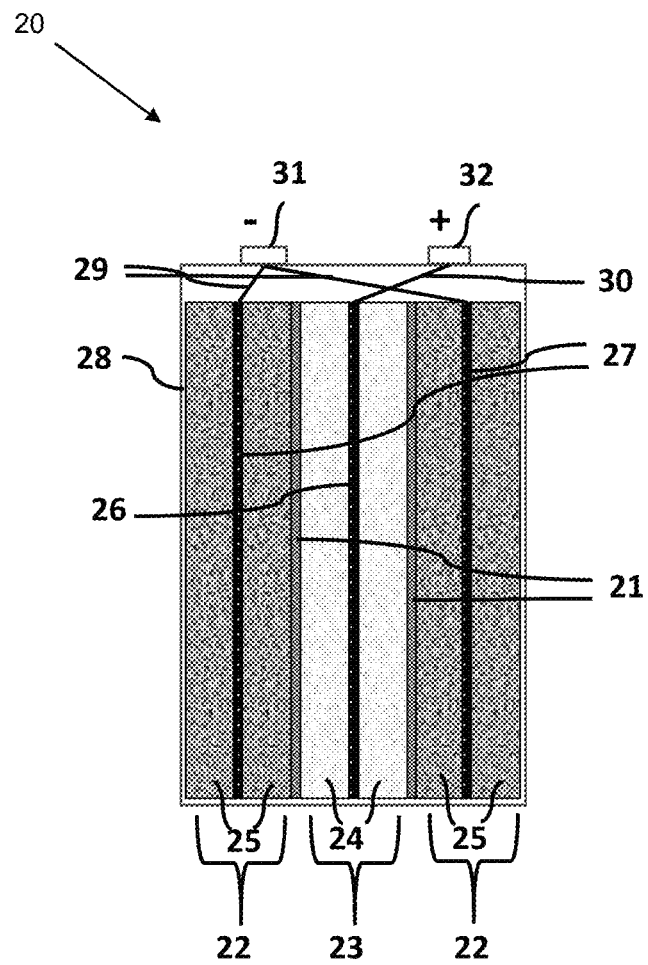
FIG. 3 shows a second embodiment of a rechargeable battery cell according to this disclosure in a cross-sectional illustration.

FIG. 3 shows a second embodiment of a rechargeable battery cell 20 according to this disclosure in a cross-sectional illustration. Said second embodiment differs from the first embodiment shown in FIG. 1 in that the electrode array comprises a positive electrode 23 and two negative electrodes 22. They are each separated from one another by separators 21 and surrounded by a housing 28. The positive electrode 23 has a discharge element 26 in the form of a planar metal foil, to which the active material 24 of the positive electrode 23 is applied on both sides. The negative electrodes 22 also comprise a discharge element 27 in the form of a planar metal foil, to which the active material 25 of the negative electrode 22 is applied on both sides. Alternatively, the planar discharge elements of the edge electrodes, that is, of the electrodes that close off the electrode stack, can only be coated with active material on one side. The non-coated side faces the housing wall. The electrodes 22, 23 are connected to corresponding contacts 31, 32 of the rechargeable battery cell 20 via electrode connections 29, 30.

Figure 4:
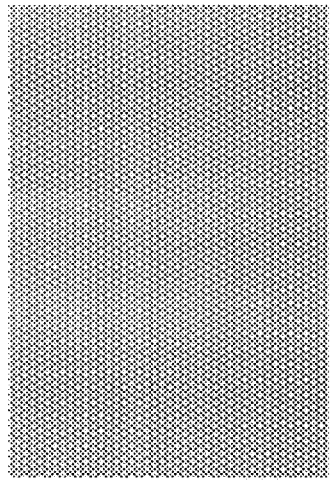
FIG. 4 shows a detail of the second embodiment from FIG. 3.

FIG. 4 shows the planar metal foil which serves as a discharge element 26, 27 for the positive electrodes 23 and the negative electrodes 22 in the second embodiment from FIG. 3. This metal foil has a perforated or mesh-like structure having a thickness of 20 μm.

Figure 5:
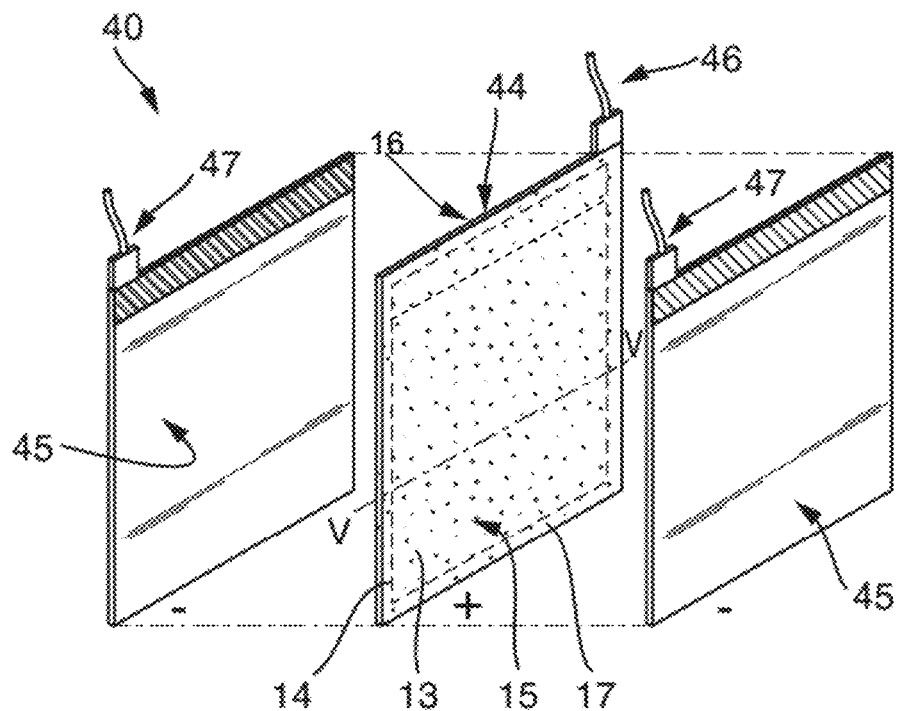
FIG. 5 shows a third embodiment of the rechargeable battery cell according to this disclosure in an exploded illustration.

FIG. 5 shows a third embodiment of a rechargeable battery cell 40 according to this disclosure in an exploded illustration. This third embodiment differs from the two embodiments explained above in that the positive electrode 44 is enveloped by a sheath 13. In this case, a surface area of the sheath 13 is greater than a surface area of the positive electrode 44, the boundary 14 of which is shown in FIG. 5 as a dashed line. Two layers 15, 16 of the sheath 13 that cover the positive electrode 44 on both sides are connected to one another at the circumferential edge of the positive electrode 44 by an edge connection 17. The two negative electrodes 45 are not enveloped. The electrodes 44 and 45 can be contacted via the electrode connections 46 and 47.

Example 1: Preparation of a Reference Electrolyte

A reference electrolyte used for the examples described below was produced according to the method described in patent specification EP 2 954 588 B1 (hereinafter referred to as [V3]). First, lithium chloride (LiCl) was dried under vacuum at 120° C. for three days. Aluminum particles (Al) were dried under vacuum for two days at 450° C. LiCl, aluminum chloride (AlCl$_3$) and Al were mixed together in an AlCl$_3$:LiCl:Al molar ratio of 1:1.06:0.35 in a glass bottle having an opening to allow gas to escape. This blend was thereafter heat-treated in stages to produce a molten salt. After cooling, the salt melt formed was filtered, then cooled to room temperature and finally SO$_2$ was added until the desired molar ratio of SO$_2$ to LiAlCl$_4$ was formed. The reference electrolyte thus formed had the composition LiAlCl$_4$*x SO$_2$, wherein x is dependent on the amount of SO$_2$ supplied.

Example 2: Preparation of Four Embodiments 1, 2, 3 and 4 of an SO$_2$—Based Electrolyte for a Battery Cell Four embodiments 1, 2, 3 and 4 of the SO$_2$-based electrolyte were prepared for the experiments described below (hereinafter referred to as electrolytes 1, 2, 3 and 4). For this purpose, four different first conducting salts according to formula (I) were initially prepared using a manufacturing process described in the following documents [V4], [V5] and [V6]:

[V4] "I. Krossing, *Chem. Eur. J.* 2001, 7, 490;

[V5] S. M. Ivanova et al., *Chem. Eur. J.* 2001, 7, 503;

[V6] Tsujioka et al., *J. Electrochem. Soc.,* 2004, 151, A1418"

These four different, first conducting salts according to formula (I) are referred to below as compounds 1, 2, 3 and 4. They come from the family of polyfluoroalkoxyaluminates and were prepared in hexane according to the following reaction equation, starting from LiAlH$_4$ and the corresponding alcohol R—OH with R$^1$=R$^2$=R$^3$=R$^4$.

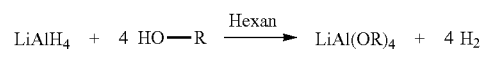

As a result, compounds 1, 2, 3 and 4 shown below were formed using the sum and structural formulas:

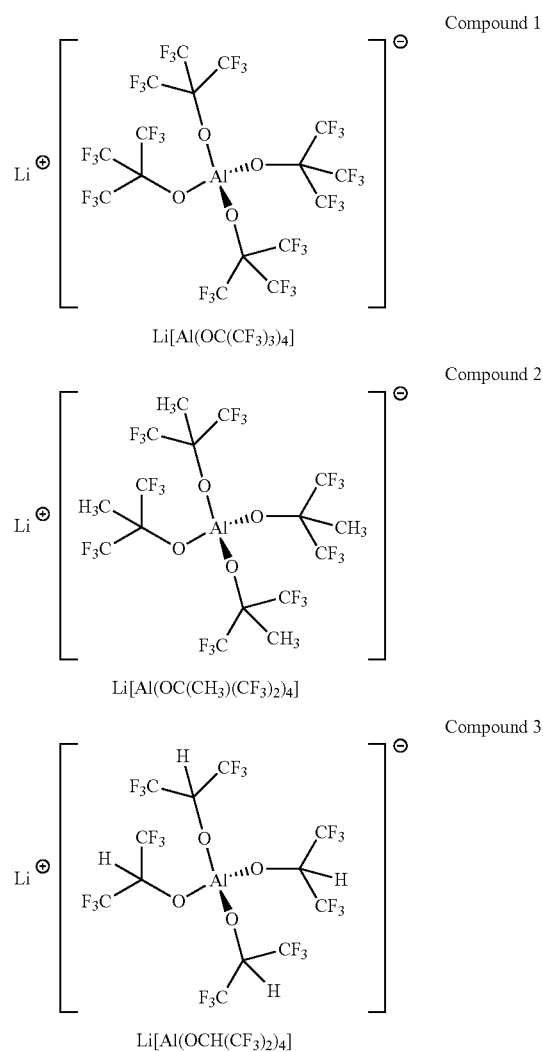

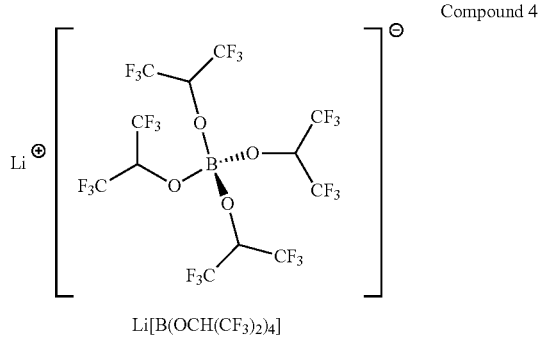

Compound 4

Li[B(OCH(CF₃)₂)₄]

Compounds 1, 2, 3 and 4 were first recrystallized for purification. As a result, residues of the educt LiAlH₄ were removed from the first conducting salt, since said educt could possibly lead to the formation of sparks with possibly existing traces of water in SO₂.

Compounds 1, 2, 3 and 4 were then dissolved in SO₂. It was found that compounds 1, 2, 3 and 4 dissolve well in SO₂.

The preparation of electrolytes 1, 2, 3 and 4 was performed at low temperature or under pressure according to process steps 1 to 4 listed below:
1) receiving of the respective compound 1, 2, 3 and 4 in a pressure piston each with a riser pipe,
2) evacuation of the pressure pistons,
3) inflow of liquid SO₂ and
4) repetition of steps 2+3 until the target amount of SO₂ was added.

The respective concentration of compounds 1, 2, 3 and 4 in electrolytes 1, 2, 3 and 4 was 0.6 mol/L (molar concentration based on 1 liter of the electrolyte), unless otherwise described in the description of the experiment. The experiments described below were performed using electrolytes 1, 2, 3 and 4 and the reference electrolyte.

Example 3: Production of Test Full Cells

The test full cells used in the experiments described below are rechargeable battery cells having two negative electrodes and one positive electrode, each separated by a separator. The positive electrodes included an active material, a conductivity mediator and a binder. The active material of the positive electrode is named in the respective experiment. The negative electrodes comprised metallic lithium as the active material, which was deposited on the discharge element of the negative electrode or was already present. The discharge element of the positive and negative electrodes was made of nickel. The test full cells were each filled with the electrolyte required for the experiments, that is, either with the reference electrolyte or electrolytes 1, 2, 3 or 4.

Several, that is, two to four, identical test whole cells were produced for each experiment. The results presented in the experiments are each mean values from the measured values obtained for the identical test full cells.

Example 4: Measurement in Test Full Cells

Coating Layer Capacity:
The capacity consumed in the first cycle to form a coating layer on the negative electrode is an important criterion for the quality of a battery cell. This coating layer is formed on the negative electrode when the test full cell is charged for the first time. Lithium ions are irreversibly consumed for this formation of a coating layer (coating layer capacity), so that the test full cell has less cyclic capacity available for the subsequent cycles. The coating layer capacity in % of the theory that was used to form the coating layer on the negative electrode is calculated according to the following formula:

Coating layer capacity [in % of the theory]=($Q_{lad}$ (xmAh)−$Q_{ent}$(ymAh))/$Q_{NEL}$ $Q_{lad}$ describes the amount of charge specified in the respective experiment in mAh; $Q_{ent}$ describes the amount of charge in mAh that was obtained when the test full cell was subsequently discharged. $Q_{NEL}$ is the theoretical capacity of the negative electrode used. The theoretical capacity is calculated, for example, in the case of graphite, to a value of 372 mAh/g.

The nominal capacity is obtained by subtracting the coating layer capacity (=$Q_{lad}$(x mAh)−$Q_{ent}$ (y mAh)) from the theoretical capacity of the positive electrode.

Discharge Capacity:
For measurements in test full cells, for example, the discharge capacity is determined from the number of cycles. For this purpose, the test full cells are charged with a certain charge current intensity up to a certain upper potential. The corresponding upper potential is held until the charge current has dropped to a certain value. The discharge then takes place with a certain discharge current intensity up to a certain discharge potential. This charging method is called I/U charging. This process is repeated depending on the desired number of cycles.

The upper potentials or the discharge potential and the respective charge or discharge current intensities are given in the experiments. The value to which the charge current must have dropped is also described in the experiments.

The term "upper potential" is used as a synonym for the terms "charge potential," "voltage," "end-of-charge voltage" and "upper potential limit." The terms denote the voltage/potential up to which a cell or battery is charged with the aid of a battery charger.

The battery is preferably charged at a current rate of C/2 and at a temperature of 22° C. With a charge or discharge rate of 1C, by definition, the nominal capacity of a cell is charged or discharged in one hour. A charge rate of C/2 means a charge time of 2 hours.

The term "discharge potential" is used synonymously with the term "lower cell voltage." This describes the voltage/potential up to which a cell or battery is discharged with the aid of a battery charger.

The battery is preferably discharged at a current rate of C/2 and at a temperature of 22° C.

The discharge capacity is obtained from the discharge current and the time until the criteria for ending the discharge are fulfilled. The associated figures show mean values for the discharge capacities as a function of the number of cycles. These mean values of the discharge capacities are expressed as a percentage of the nominal capacity.

The ratio of the discharge capacity $Q_{ent}$ and the charge capacity $Q_{lad}$ results in the cycle efficiency Z=$Q_{ent}$/$Q_{lad}$. The charge capacity is specified by the charge parameters. The discharge capacity is determined for each cycle as described above.

Experiment 1: Cycles of Test Full Cells Using a Charge and Discharge Current of 0.1 mA/cm²

Experiments in test full cells according to Example 3 were performed using metallic lithium as an active material of the negative electrode. The test full cells were filled with electrolyte 1 described in Example 2. The positive electrodes comprised lithium nickel manganese cobalt oxide as an active material. Two charge/discharge cycles were performed and the discharge capacities were determined. Two charge/discharge cycles were performed directly with the first test full cell. An initialization cycle was performed with the second test full cell before the two charge/discharge cycles. Metallic lithium was deposited for 3 min at 12 mA and further until the end of the charge at 0.1 mA/cm$^2$. This was followed by a discharge. The two charge/discharge cycles then started. The influence of external pressure was examined using the third test full cell. For this purpose, the housing of the test full cell was pressed together in a defined manner from the outside at a pressure of approx. 50 N/cm$^2$. An initialization cycle was then performed as described for the second full test cell, followed by two charge/discharge cycles. The test full cells were charged at a current of 0.1 mA/cm$^2$ up to a potential of 4.4 volts and until a charge capacity of 8 mAh/cm$^2$ was reached. The discharge then took place at a current of 0.1 mA/cm$^2$ until a potential of 2.9 volts was reached.

Figure 6:
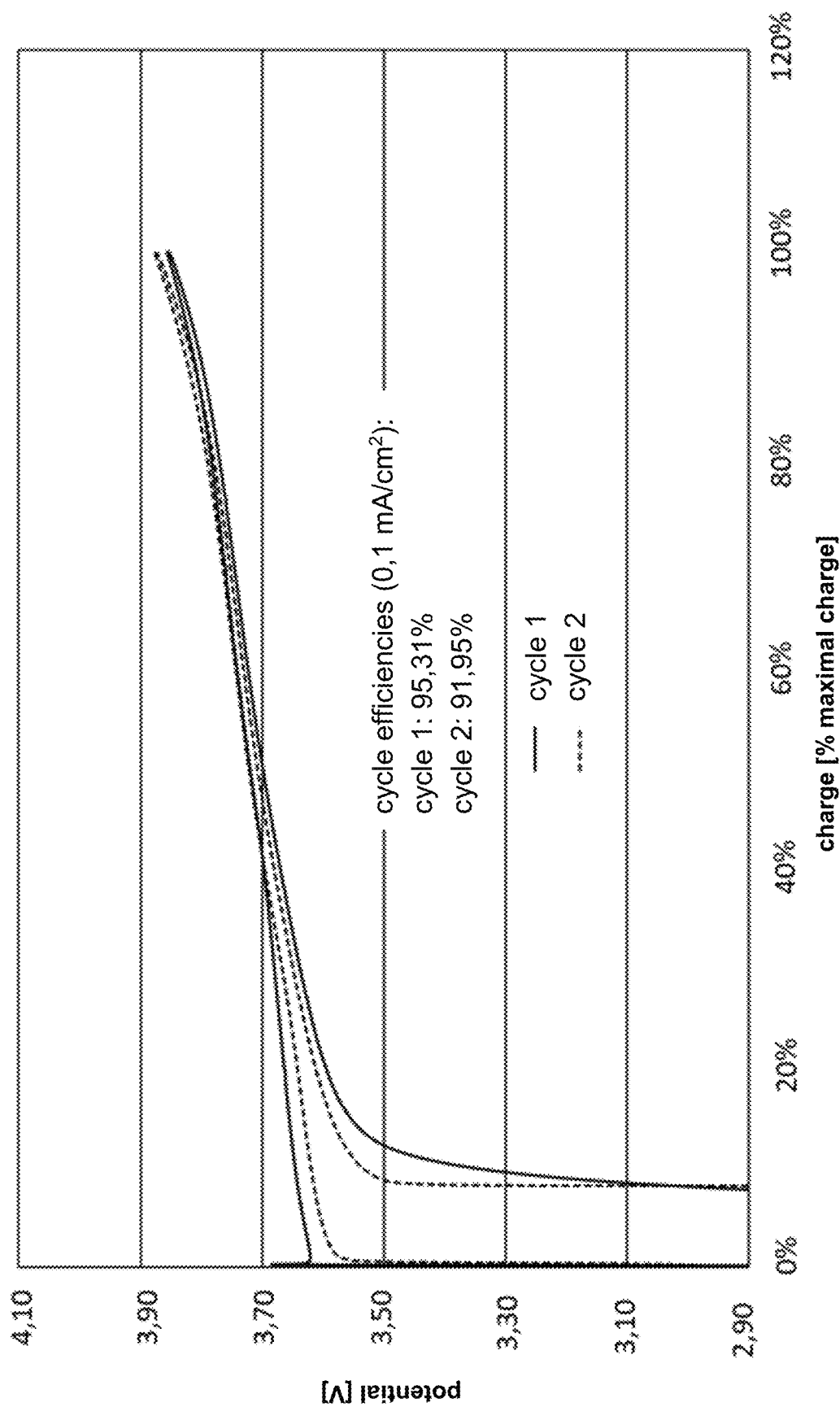
FIG. 6 shows the potential profile in volts [V] during two charge/discharge cycles as a function of the percentage charge of a test full cell having metallic lithium as the active material of the negative electrode, wherein the charge and discharge current is 0.1 mA/cm$^2$.
Figure 7:
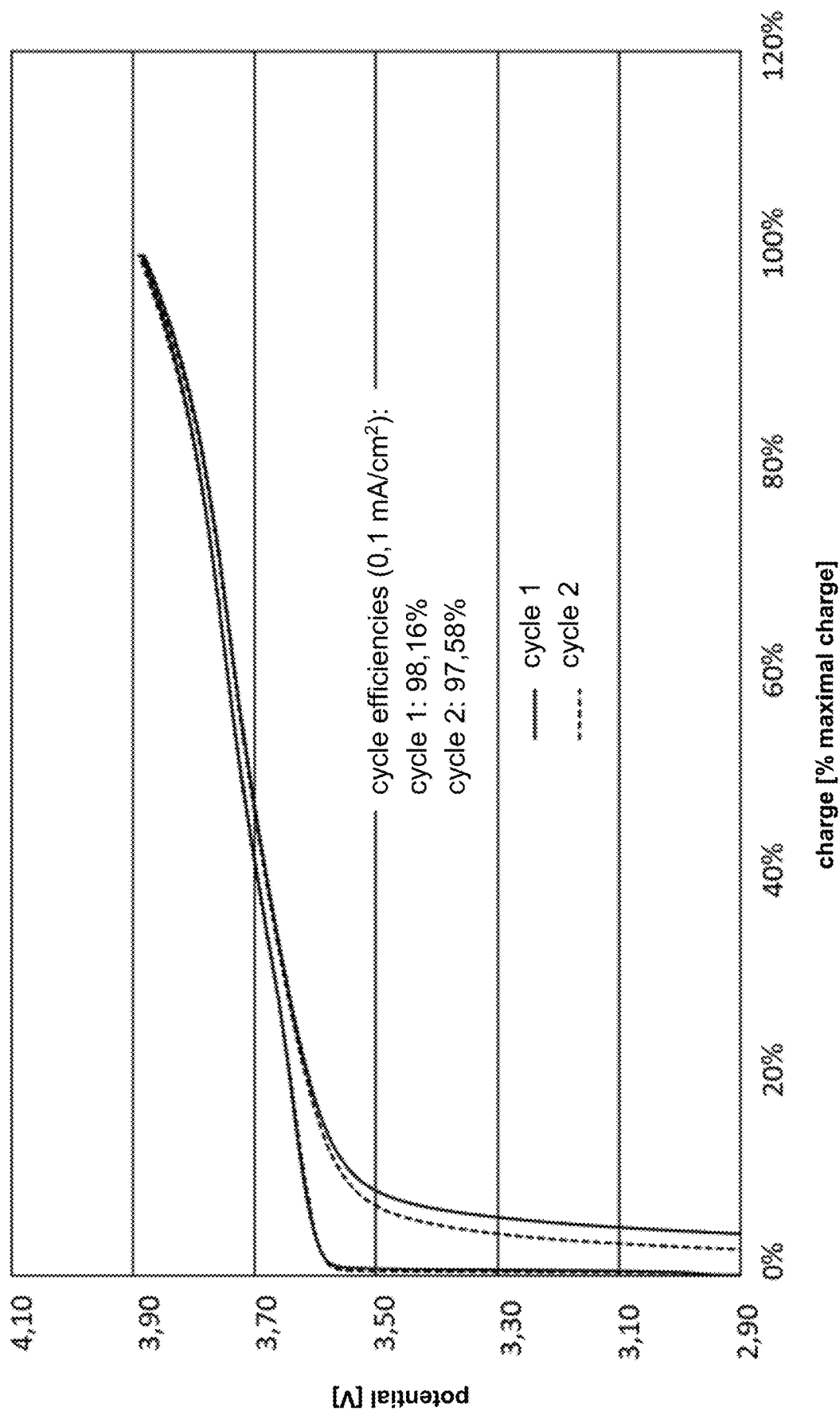
FIG. 7 shows the potential profile in volts [V] during two charge/discharge cycles as a function of the percentage charge of a test full cell having metallic lithium as the active material of the negative electrode, wherein an initialization cycle was performed before the two charge/discharge cycles and the charge and discharge current is 0.1 mA/cm$^2$.
Figure 8:
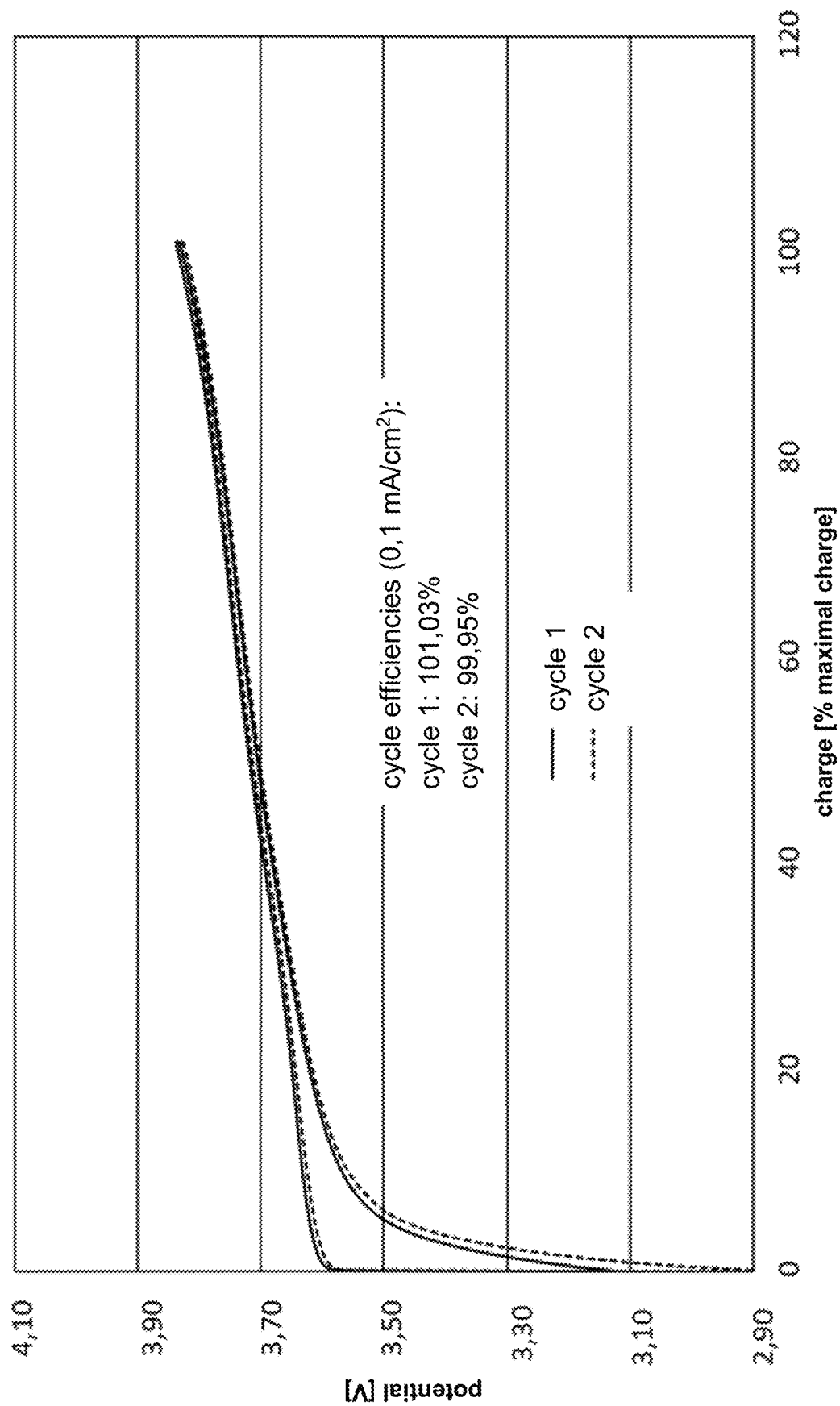
FIG. 8 shows the potential profile in volts [V] during two charge/discharge cycles as a function of the percentage charge of a test full cell having metallic lithium as the active material of the negative electrode, wherein an external pressure was applied to the cell, an initialization cycle was performed before the two charge/discharge cycles and the charge and discharge current is 0.1 mA/cm$^2$.

FIGS. 6, 7 and 8 each show the potential in volts of the three test full cells during charging and discharging as a function of the charge in %, which is related to the maximum charge. The cycle efficiencies of the two cycles shown are also depicted for each test full cell in the figures.

All three test full cells show a similar potential profile in cycle 1 and cycle 2. The cycle efficiencies are over 90% for all test full cells and are somewhat better for the test full cells in which an initialization cycle was performed.

Experiment 2: Morphology of Lithium Deposition

Figure 9:
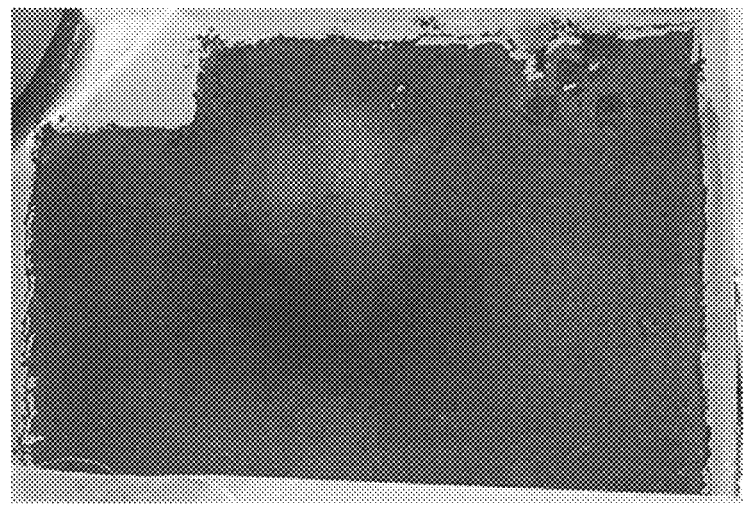
FIG. 9 shows a negative electrode obtained after dismantling the second test full cell from Experiment 1.

The second test full cell from Experiment 1 was dismantled after a few cycles to determine the morphology of the deposited metallic lithium. FIG. 9 shows this negative electrode in which a homogeneous and compact lithium deposition can be seen. No punctiform lithium deposits can be seen, rather, the entire electrode is evenly covered. This advantageous deposition of lithium indicates a good cycle stability of lithium in the electrolyte 1 used.

Experiment 3: Cycles of Test Full Cells Using a Charge and Discharge Current of 0.5 mA/cm$^2$ and 1.0 μmA/cm$^2$ Two further test full cells were produced as described in Experiment 1 in order to investigate charging and discharging at higher currents. Two charge/discharge cycles were performed using a charge and discharge current of 0.5 mA/cm$^2$ with the first test full cell. The charge and discharge current was 1.0 μmA/cm$^2$ in the second test full cell. Said cell was charged and discharged 21 times. An initialization cycle was performed for both test full cells before the charge/discharge cycles. The test full cells were charged at a current of 0.5 mA/cm$^2$ or 1.0 μmA/cm$^2$ up to a potential of 4.4 volts and until a charge capacity of 8 mAh/cm$^2$ was reached. The discharge then took place at a current of 0.5 mA/cm$^2$ or 1.0 mA/cm$^2$ until a potential of 2.9 volts was reached.

Figure 10:
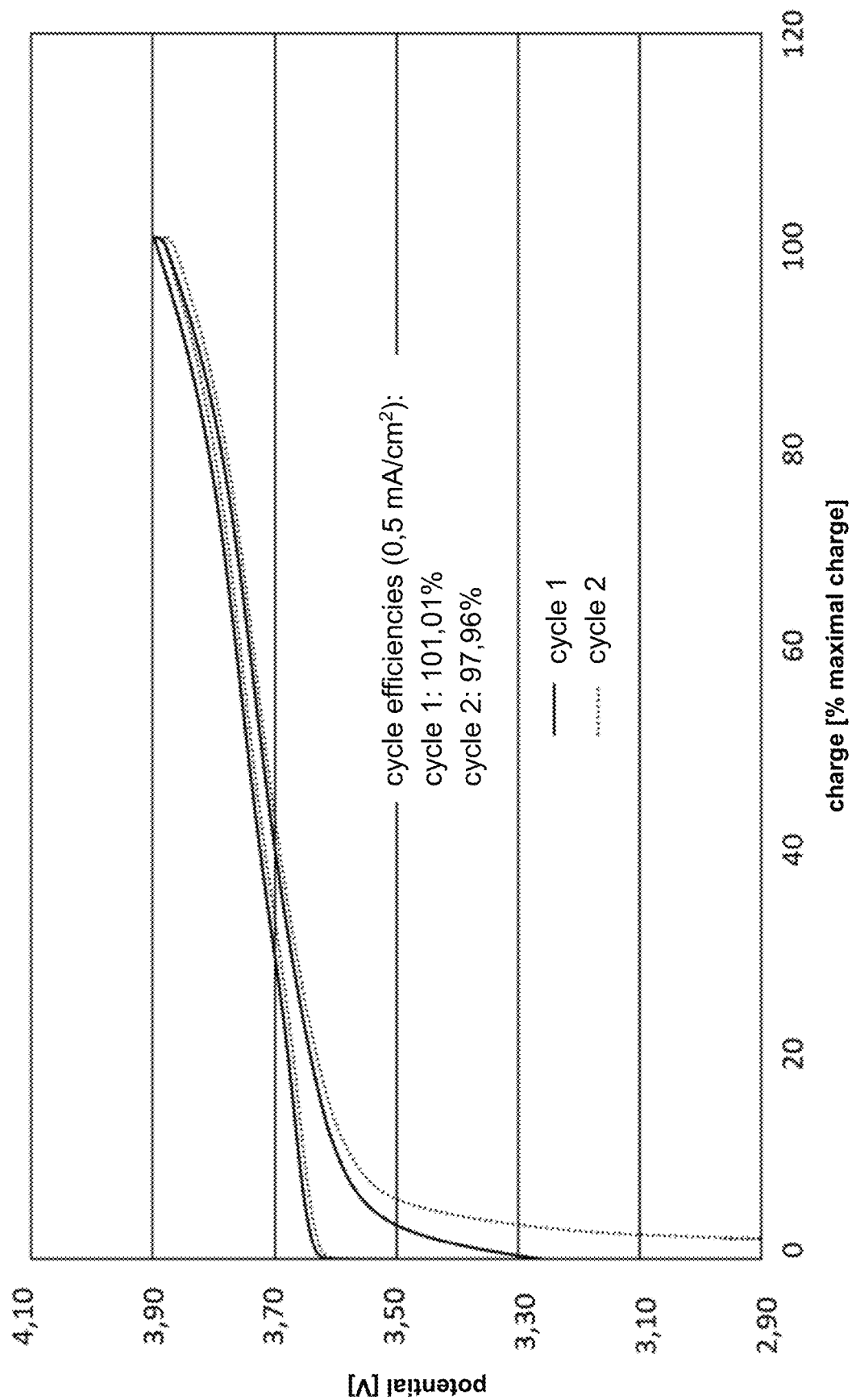
FIG. 10 shows the potential profile in volts [V] during two charge/discharge cycles as a function of the percentage charge of a test full cell having metallic lithium as the active material of the negative electrode, wherein an initialization cycle was performed before the two charge/discharge cycles and the charge and discharge current is 0.5 mA/cm$^2$.
Figure 11:
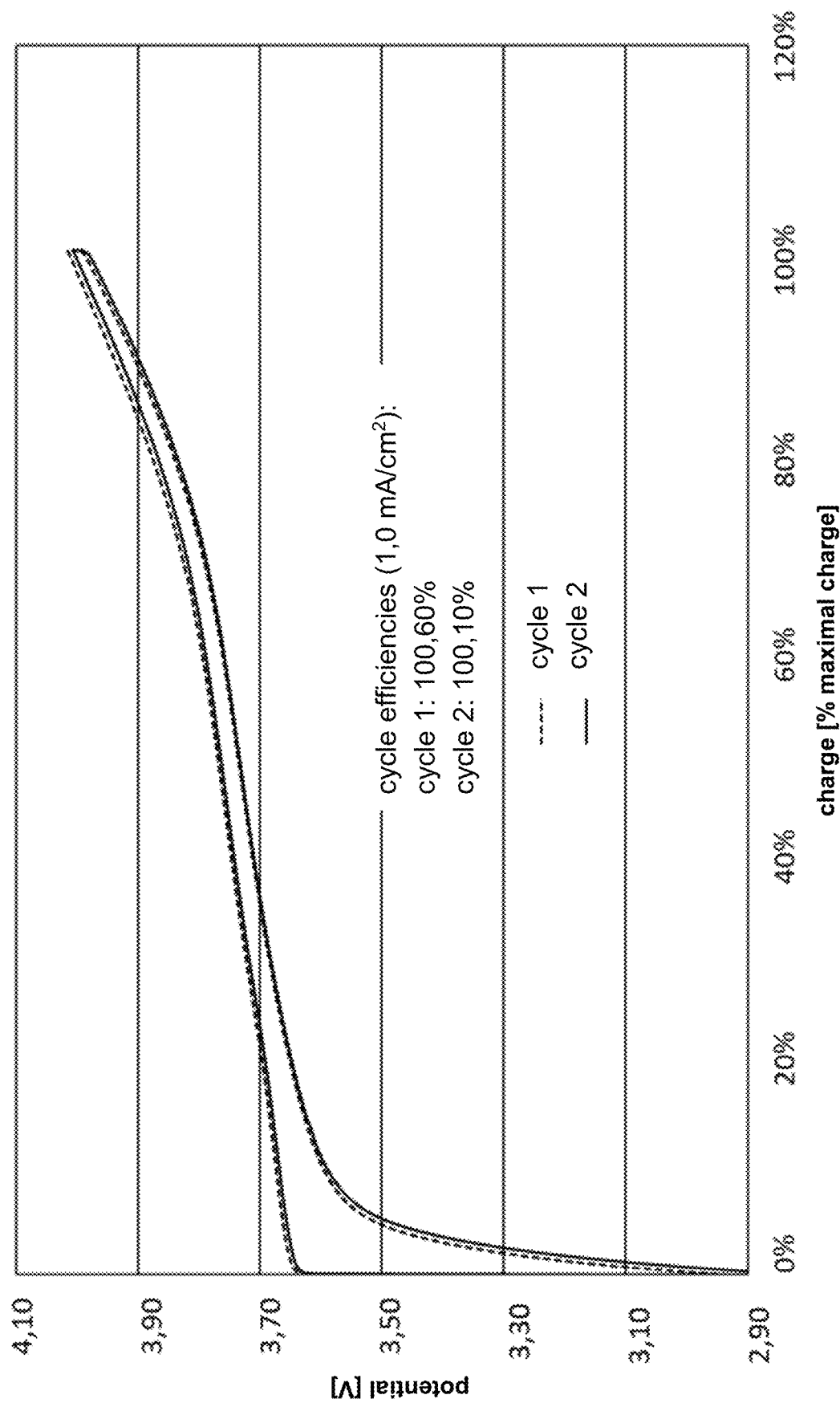
FIG. 11 shows the potential profile in volts [V] during two charge/discharge cycles as a function of the percentage charge of a test full cell having metallic lithium as the active material of the negative electrode, wherein an initialization cycle was performed before the two charge/discharge cycles and the charge and discharge current is 1.0 mA/cm$^2$.
Figure 12:
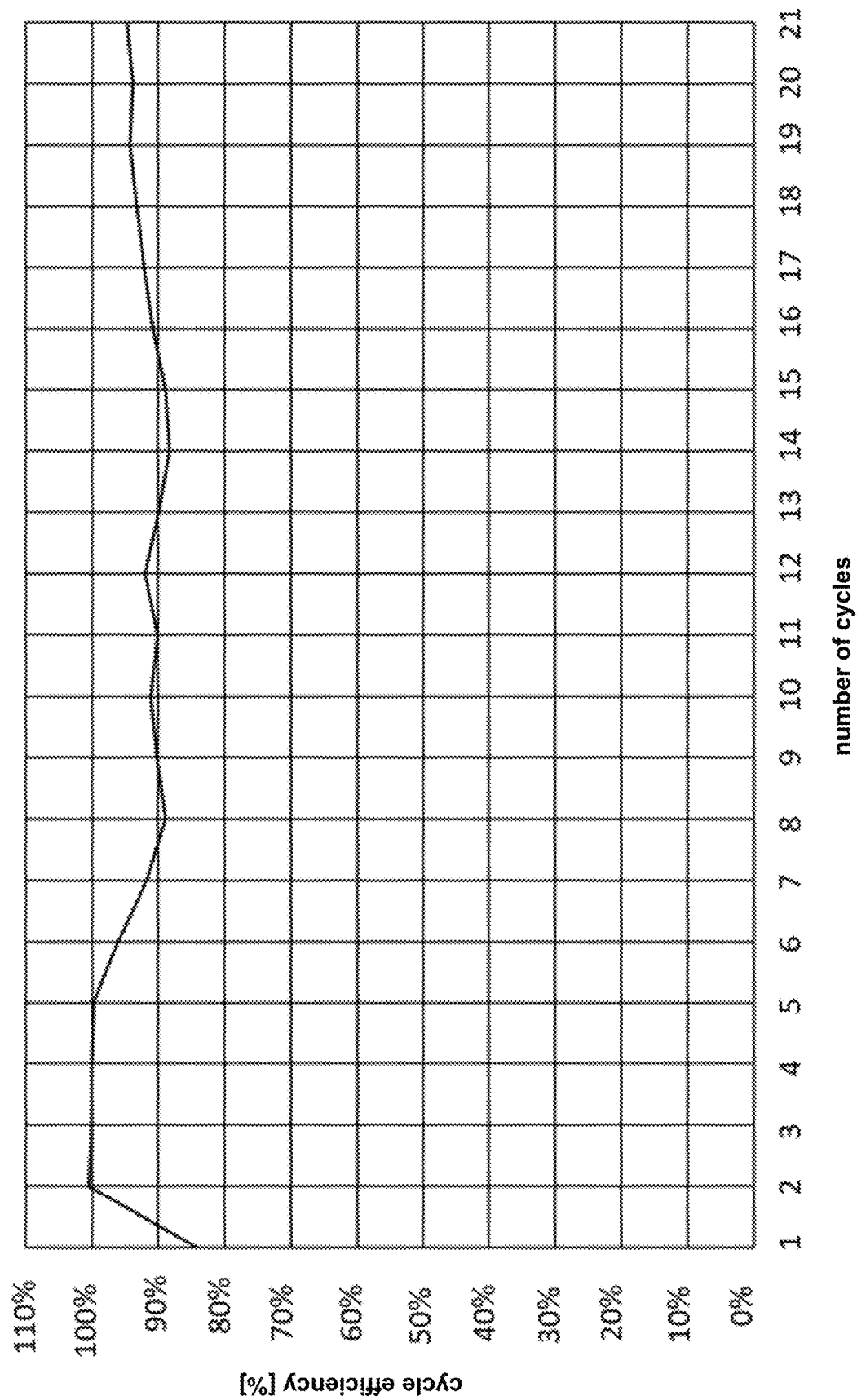
FIG. 12 shows the cycle efficiency in % as a function of the number of cycles of a test full cell having metallic lithium as the active material of the negative electrode, wherein the charge and discharge current is 1.0 μmA/cm$^2$.

FIGS. 10 and 11 each show the potential in volts of the two test full cells during charging and discharging as a function of the charge in %, which is related to the maximum charge. The cycle efficiencies of the two cycles shown are also depicted for each test full cell in FIGS. 10 and 11. Both full cells show a similar potential profile in cycle 1 and cycle 2. The cycle efficiencies are over 97% for both test full cells and are somewhat better for the test full cell operated at a current of 1 mA/cm$^2$. Further cycles were performed with this test full cell (1 mA/cm$^2$). FIG. 12 shows the cycle efficiency in % as a function of the number of cycles. The cycle efficiency shows a stable profile and approx. 95% is still achieved in cycle 21.

Experiment 4: Cycle Efficiencies of Test Full Cells Having Electrolyte 1 Compared to Test Full Cells Having a Reference Electrolyte In order to compare the cycle efficiencies of test full cells having electrolyte 1 with a test full cell having a reference electrolyte, test full cells having a reference electrolyte were first produced. The test full cells comprised lithium iron phosphate as the active material of the positive electrode and metallic lithium as the active material of the negative electrode. The test full cell comprised a reference electrolyte of the composition LiAlCl$_4$×6SO$_2$.

To prevent corrosion of lithium, that is, the loss in said electrolyte, fast charging and discharging rates of 7.5 mAh/cm$^2$ were selected. The test full cells were charged at this rate to a potential of 3.6 V and then discharged to a potential of 2.5 V.

For comparison, the second test full cell from Experiment 1 (charge/discharge current 0.1 mA/cm$^2$) and the second test full cell from Experiment 3 (charge/discharge current 1 mA/cm$^2$), were used, both of which comprised electrolyte 1.

Figure 13:
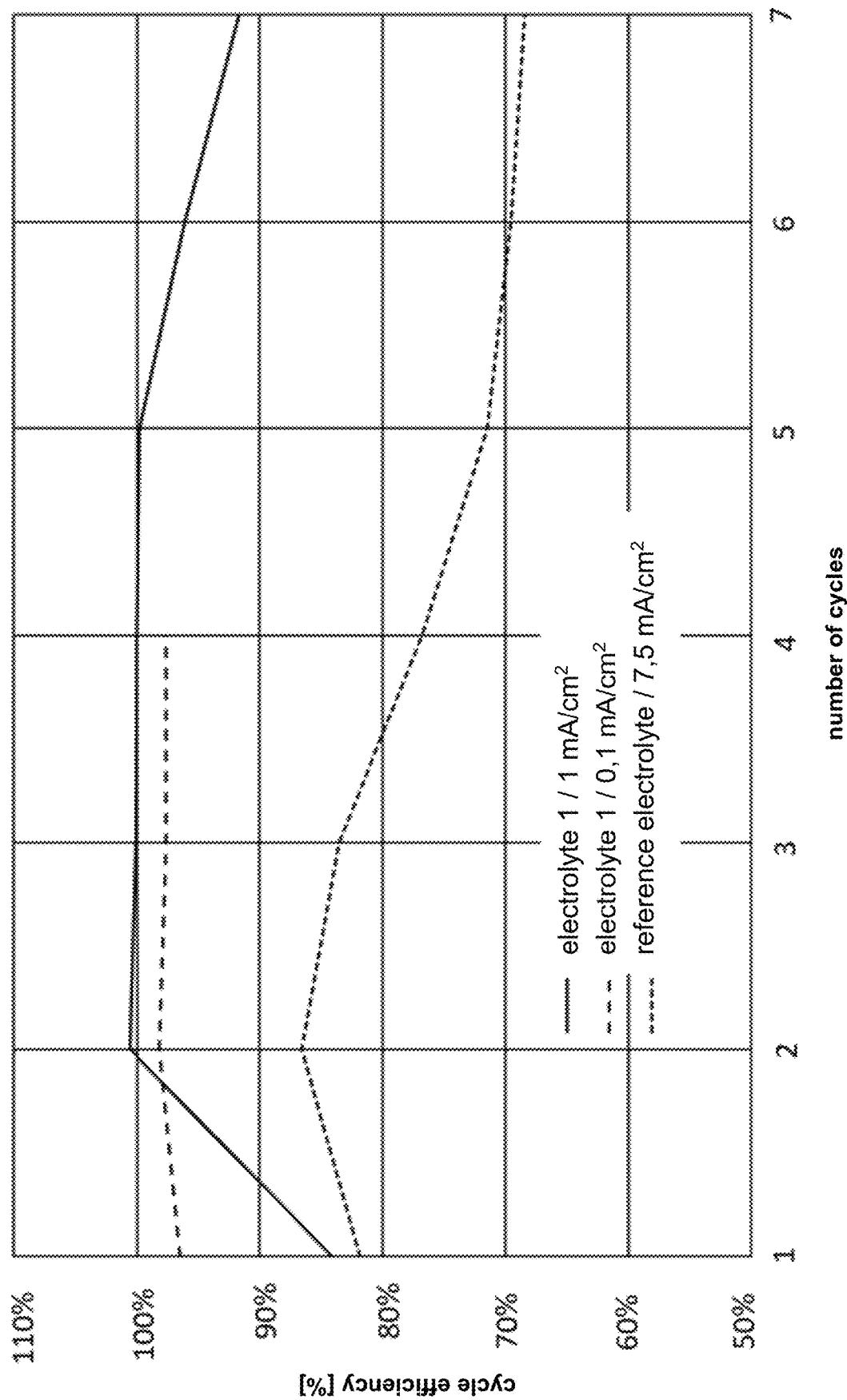
FIG. 13 shows the cycle efficiencies in % as a function of the number of cycles of three test full cells having metallic lithium as the active material of the negative electrode, wherein two test full cells comprised electrolyte 1 and one test full cell comprised a reference electrolyte.

FIG. 13 shows the cycle efficiencies in % as a function of the number of cycles of the first four charge/discharge cycles of the test full cell using a charge/discharge current of 0.1 mA/cm$^2$, the first seven charge/discharge cycles of the test full cell using a charge/discharge current of 1 mA/cm$^2$ and the first seven charge/discharge cycles of the test full cell having the reference electrolyte. The cycle efficiencies of the test full cells having electrolyte 1 show a very stable profile. The first test full cell achieves a cycle efficiency of 98% after four cycles, the second test full cell a cycle efficiency of 92% after seven cycles. The test full cell having the reference electrolyte shows much worse behavior. It achieves a cycle efficiency of only approx. 68% in cycle 7.

Experiment 5: Determination of the Conductivities of Electrolytes 1, 3 and 4

To determine the conductivity, electrolytes 1, 3 and 4 were prepared using different concentrations of compounds 1, 3 and 4. The conductivities of the electrolytes were determined using a conductive measurement method for each concentration of the various compounds. After temperature control, a two-electrode sensor was held touching in the solution and measured in a measuring range of 0-50 μmS/cm. During the measurements, it was noted that the sensor can react with the SO$_2$-containing electrolyte solution.

Figure 14:
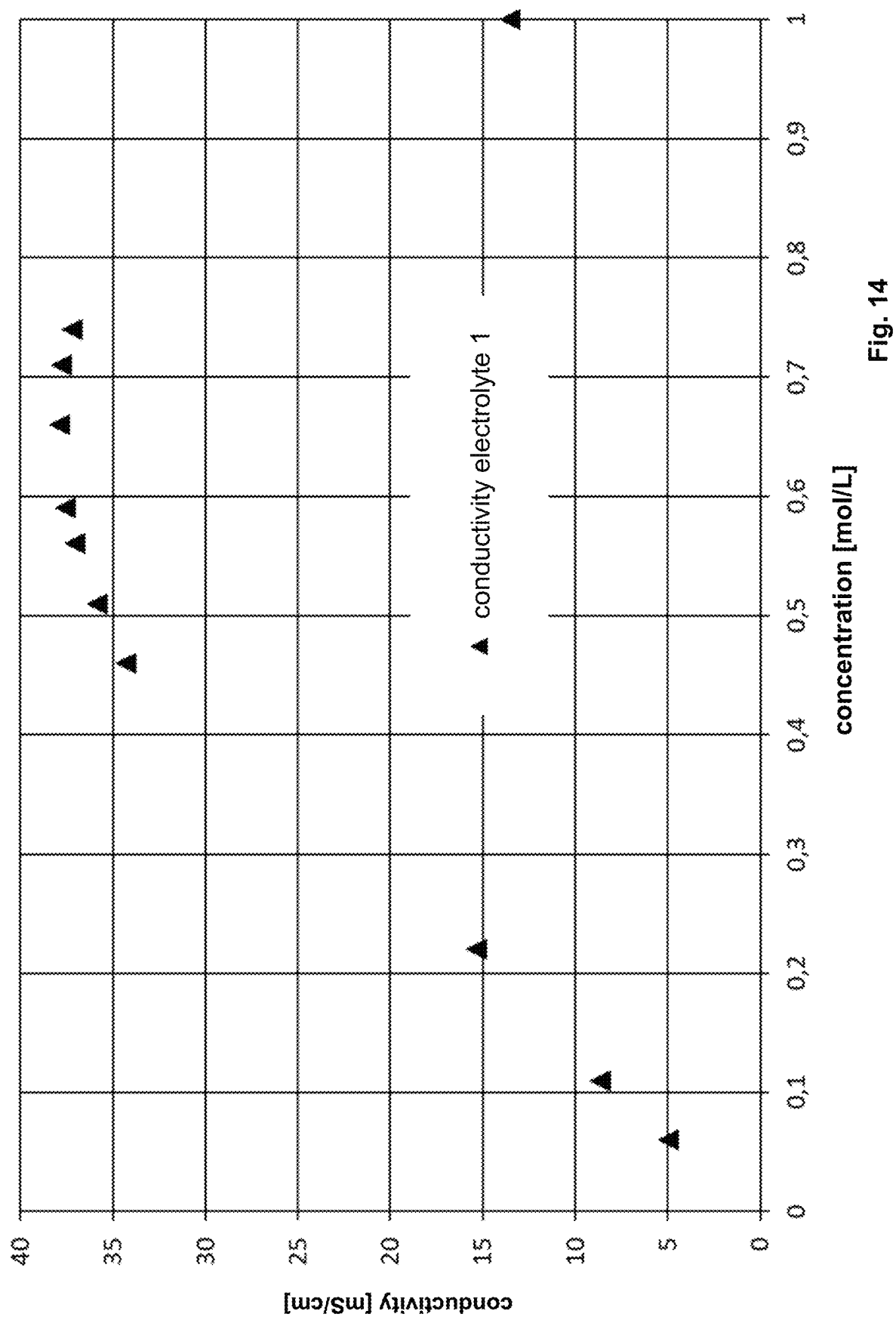
FIG. 14 shows the conductivity in [mS/cm] of electrolyte 1 as a function of the concentration of compound 1.

FIG. 14 shows the conductivity of electrolyte 1 as a function of the concentration of compound 1. A maximum of the conductivity can be seen at a concentration of compound 1 of 0.6 mol/L-0.7 mol/L having a value of approx. 37.9 mS/cm. In comparison, the organic electrolytes known from the prior art, such as LP30 (1 M LiPF$_6$/EC-DMC (1:1 weight)) have a conductivity of only approx. 10 μmS/cm.

Figure 15:
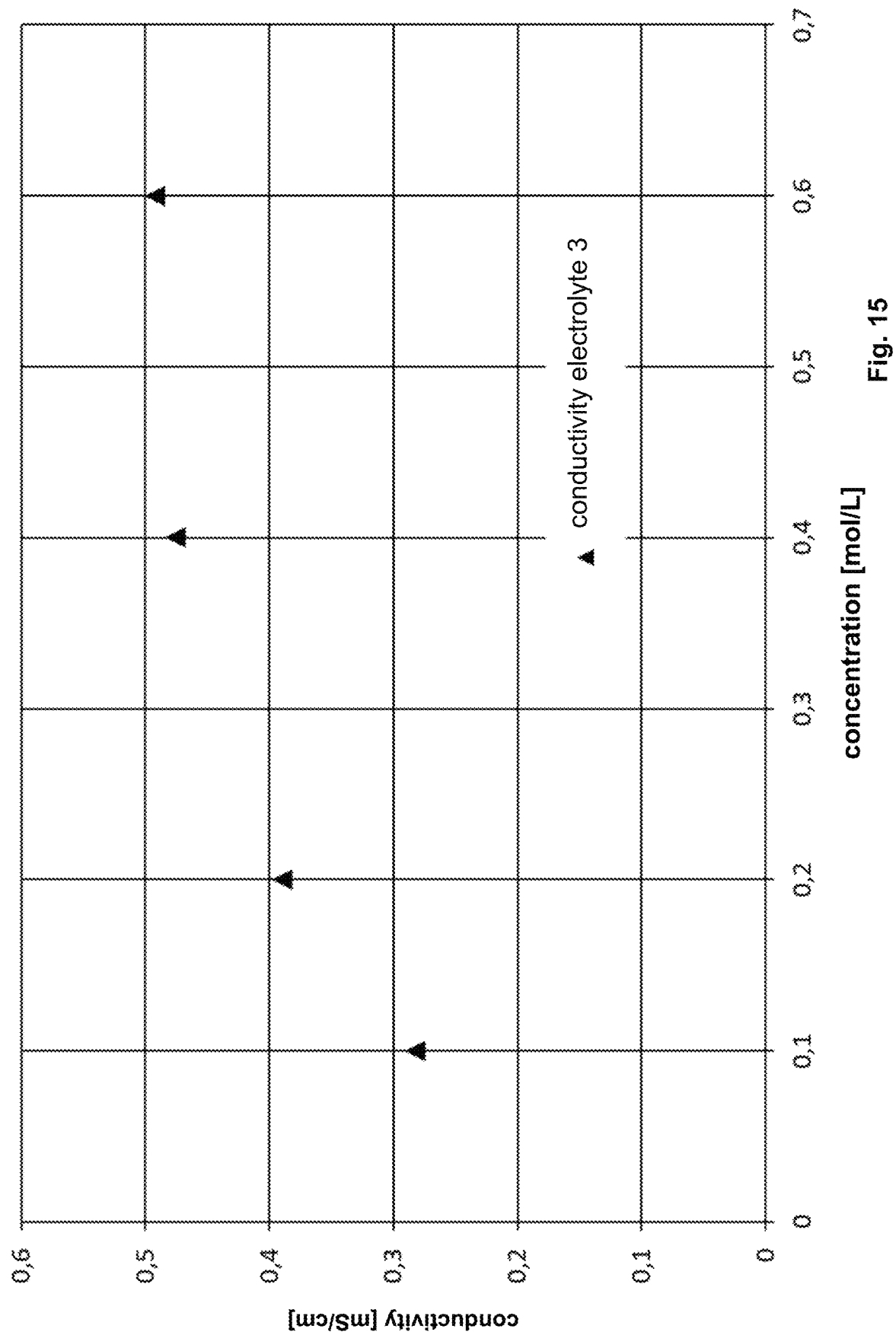
FIG. 15 shows the conductivity in [mS/cm] of electrolyte 3 as a function of the concentration of compound 3.
Figure 16:
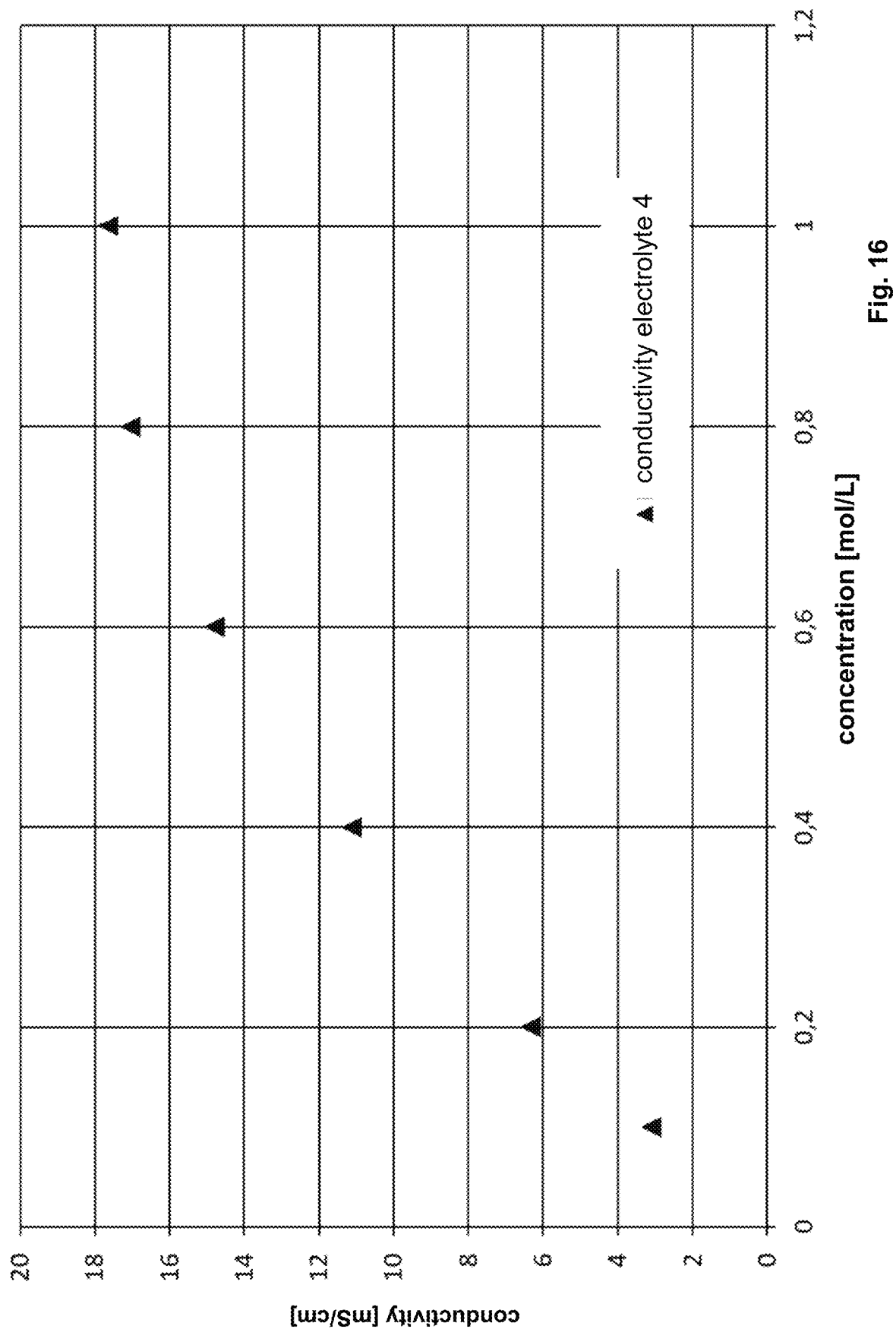
FIG. 16 shows the conductivity in [mS/cm] of electrolyte 4 as a function of the concentration of compound 4.

FIG. 15 (electrolyte 3) and 16 (electrolyte 4) show the conductivity values for electrolyte 3 and electrolyte 4 determined for the different concentrations. With electrolyte 4, a maximum of 18 mS/cm is achieved at a conducting salt concentration of 1 mol/L. Electrolyte 3 shows its highest conductivity of 0.5 mS/cm at a conducting salt concentration of 0.6 mol/L. Although electrolyte 3 shows a lower conductivity, as in experiment 4, charging or discharging of a test full cell is quite possible.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A rechargeable battery cell, comprising:
   at least one positive electrode having a discharge element;
   at least one negative electrode having a discharge element and comprising metallic lithium as an active material at least in the charged state of the rechargeable battery cell;
   a housing; and
   an $SO_2$ based electrolyte comprising a first conducting salt which has the formula (I),

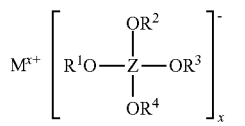

Formula (I)

wherein:
   M is a metal selected from the group consisting of alkali metals, alkaline earth metals, metals of group 12 of the periodic table of the elements, and aluminum;
   x is an integer from 1 to 3;
   $R^1$, $R^2$, $R^3$ and $R^4$ are selected independently of one another from the group consisting of $C_1$-$C_{10}$ alkyl, $C_2$-$C_{10}$ alkenyl, $C_2$-$C_{10}$ alkynyl, $C_3$-$C_{10}$ cycloalkyl, $C_6$-$C_{14}$ aryl and $C_5$-$C_{14}$ heteroaryl; and
   Z is aluminum or boron.

2. The rechargeable battery cell according to claim 1, wherein metallic lithium is depositable on the discharge element of the negative electrode when the rechargeable battery cell is being charged.

3. The rechargeable battery cell according to claim 1, wherein metallic lithium is located on the discharge element of the negative electrode in the charged state of the rechargeable battery cell.

4. The rechargeable battery cell according to claim 1, wherein metallic lithium is already located on the discharge element of the negative electrode before the first charging of the rechargeable battery cell occurs.

5. The rechargeable battery cell according to claim 1, wherein the discharge element of the negative electrode is (i) planar in the form of a metal sheet or a metal foil, or (ii) three-dimensional in the form of a porous metal structure.

6. The rechargeable battery cell according to claim 5, wherein the three-dimensional porous metal structure comprises a metal foam.

7. The rechargeable battery cell according to claim 1, wherein the discharge element of the negative electrode is formed at least partially from a lithium-storing material selected from the group consisting of:
   carbon,
   a material which forms an alloy with lithium,
   a lithium intercalation material that does not comprise carbon, and
   a conversion material.

8. The rechargeable battery cell according to claim 7, wherein the carbon comprises carbon allotrope graphite and the lithium intercalation material that does not comprise carbon comprises lithium titanate, and the conversion material comprises a transition metal oxide.

9. The rechargeable battery cell according to claim 7, wherein the material which forms an active alloy with lithium is selected from the group consisting of:
   lithium-storing metals and metal alloys, and
   oxides of lithium-storing metals and metal alloys.

10. The rechargeable battery cell according to claim 9, wherein the lithium-storing metals and metal alloys comprise Si, Ge, Sn, $SnCo_xC_y$, or $SnSi_x$, and the oxides of lithium-storing metals and metal alloys comprise $SnO_x$, $SiO_x$ and oxidic glasses of Sn and Si.

11. The rechargeable battery cell according to claim 1, wherein the positive electrode comprises as active material at least one compound having the composition $Li_xM'_yM''_zO_a$, wherein:
   M' is at least one metal selected from the group consisting of the elements Ti, V, Cr, Mn, Fe, Co, Ni, Cu and Zn;
   M'' is at least one element selected from the group consisting of the elements of groups 2, 3, 4, 5, 6, 7, 8, 9, 10, 11, 12, 13, 14, 15 and 16 of the periodic table of the elements;
   x and y independently of one another are numbers greater than 0;
   z is a number greater than or equal to 0; and
   a is a number greater than 0.

12. The rechargeable battery cell according to claim 11, wherein the compound has the composition $Li_xM'_yM''_zO_a$, wherein M' is manganese and M'' is cobalt.

13. The rechargeable battery cell according to claim 12, wherein x, y and z are equal to 1 and a is equal to 4.

14. The rechargeable battery cell according to claim 11, wherein the compound has the composition $Li_xM'_yM''_zO_a$, in which M' comprises nickel and manganese and M'' is cobalt and which has the formula $Li_xNi_{y1}Mn_{y2}Co_zO_a$.

15. The rechargeable battery cell according to claim 11, wherein the compound has the composition $Li_xM'_yM''^1_{z1}M''^2_{z2}O_4$, wherein $M''^2$ is phosphorus and z2 has the value 1.

16. The rechargeable battery cell according to claim 15, wherein the compound has the composition $Li_xM'_yM''^1_{z1}PO_4$, in which M' is iron and $M''^1$ is manganese.

17. The rechargeable battery cell according to claim 16, wherein the compound has the composition $Li(Fe_{0.3}Mn_{0.7})PO_4$.

18. The rechargeable battery cell according to claim 1, wherein $R^1$, $R^2$, $R^3$ and $R^4$ are selected independently of one another from the group consisting of:
   $C_1$-$C_6$ alkyl;
   $C_2$-$C_6$ alkenyl;
   $C_2$-$C_6$ alkynyl;
   $C_3$-$C_6$ cycloalkyl;
   phenyl; and
   $C_5$-$C_7$ heteroaryl.

19. The rechargeable battery cell according to claim 18, wherein:
   the $C_1$-$C_6$ alkyl comprises $C_2$-$C_4$ alkyl;
   the $C_2$-$C_6$ alkenyl comprises $C_2$-$C_4$ alkenyl; and
   the $C_2$-$C_6$ alkynyl comprises $C_2$-$C_4$ alkynyl.

20. The rechargeable battery cell according to claim 19, wherein:

the C$_2$-C$_4$ alkyl comprises groups 2-propyl, methyl and ethyl; and the C$_2$-C$_4$ alkenyl is selected from the alkenyl groups ethenyl and propenyl.

21. The rechargeable battery cell according to claim 1, wherein at least one of R$^1$, R$^2$, R$^3$ and R$^4$ is substituted by at least one fluorine atom and/or by at least one chemical group, wherein the chemical group is selected from the group consisting of C$_1$-C$_4$ alkyl, C$_2$-C$_4$ alkenyl, C$_2$-C$_4$ alkynyl, phenyl and benzyl.

22. The rechargeable battery cell according to claim 1, wherein at least one of R$^1$, R$^2$, R$^3$ and R$^4$ of the first conducting salt is a CF$_3$ group or an OSO$_2$CF$_3$ group.

23. The rechargeable battery cell according to claim 1, wherein the first conducting salt is selected from the group consisting of:

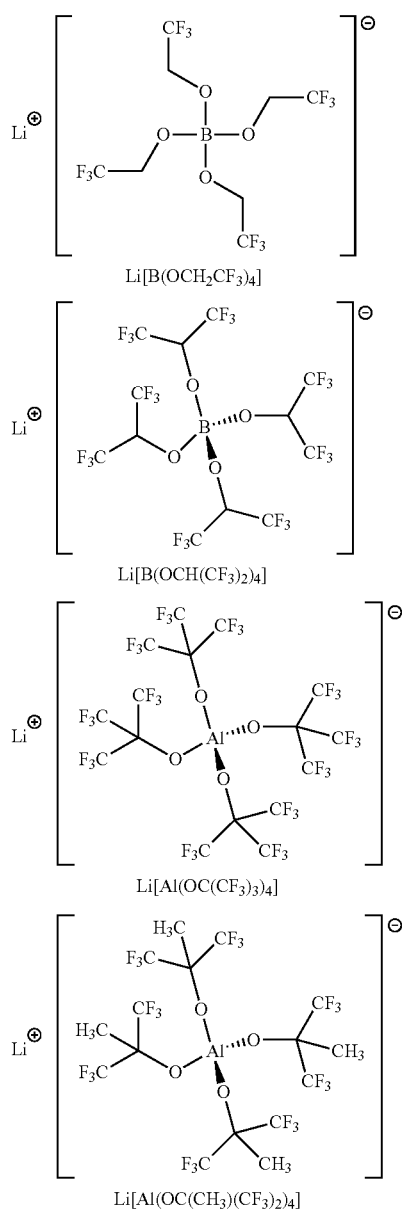

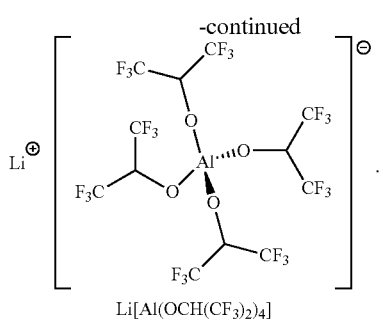

24. The rechargeable battery cell according to claim 1, wherein the electrolyte comprises at least one second conducting salt different from the first conducting salt.

25. The rechargeable battery cell according to claim 24, wherein the second conducting salt is an alkali metal compound selected from the group consisting of an aluminate, a halide, an oxalate, a borate, a phosphate, an arsenate and a gallate.

26. The rechargeable battery cell according to claim 24, wherein the second conducting salt is a lithium tetrahaloaluminate.

27. The rechargeable battery cell according to claim 26, wherein the lithium tetrahaloaluminate is lithium tetrachloroaluminate.

28. The rechargeable battery cell according to claim 1, wherein the electrolyte comprises at least one additive.

29. The rechargeable battery cell according to claim 28, wherein the additive is selected from the group consisting of vinylene carbonate and its derivatives, vinylethylene carbonate and its derivatives, methylethylene carbonate and its derivatives, lithium (bisoxalato)borate, lithium difluoro(oxalato)borate, lithium tetrafluoro(oxalato)phosphate, lithium oxalate, 2-vinylpyridine, 4-vinylpyridine, cyclic exomethylene carbonates, sultones, cyclic and acyclic sulfonates, acyclic sulfites, cyclic and acyclic sulfinates, organic esters, inorganic acids, acyclic and cyclic alkanes, which acyclic and cyclic alkanes have a boiling point of at least 36° C. at 1 bar, aromatic compounds, halogenated cyclic and acyclic sulfonylimides, halogenated cyclic and acyclic phosphate esters, halogenated cyclic and acyclic phosphines, halogenated cyclic and acyclic phosphites, halogenated cyclic and acyclic phosphazenes, halogenated cyclic and acyclic silylamines, halogenated cyclic and acyclic halogenated esters, halogenated cyclic and acyclic amides, halogenated cyclic and acyclic anhydrides, and halogenated organic heterocycles.

30. The rechargeable battery cell according to claim 1, wherein the electrolyte comprises:
(i) 5 to 99.4% by weight sulfur dioxide,
(ii) 0.6 to 95% by weight of the first conducting salt,
(iii) 0 to 25% by weight of the second conducting salt, and
(iv) 0 to 10% by weight of the additive,
based on the total weight of the electrolyte composition.

31. The rechargeable battery cell according to claim 1, wherein the molar concentration of the first conducting salt is in a range selected from the group consisting of from 0.01 mol/L to 10 mol/L, from 0.05 mol/L to 10 mol/L, from 0.1 mol/L to 6 mol/L and from 0.2 mol/L to 3.5 mol/L, based on the total volume of the electrolyte.

32. The rechargeable battery cell according to claim 1, wherein the electrolyte has a molar concentration of SO$_2$ selected from the group consisting of at least 0.1 mol SO$_2$, at least 1 mol $SO_2$, at least 5 mol $SO_2$, at least 10 mol $SO_2$ and at least 20 mol $SO_2$ per mole of conducting salt.

33. The rechargeable battery cell according to claim 1, wherein the positive electrode comprises at least one metal compound selected from the group consisting of a metal oxide, a metal halide and a metal phosphate.

34. The rechargeable battery cell according to claim 30, wherein the metal of the metal compound is a transition metal of atomic numbers 22 to 28 of the periodic table of the elements.

35. The rechargeable battery cell according to claim 34, wherein the metal of the metal compound is cobalt, nickel, manganese or iron.

36. The rechargeable battery cell according to claim 1, wherein the positive electrode comprises at least one metal compound which has the chemical structure of a spinel, a layered oxide, a conversion compound or a polyanionic compound.

37. The rechargeable battery cell according to claim 1, wherein the positive electrode has a discharge element, which is formed (i) planar in the form of a metal sheet or a metal foil, or (ii) three-dimensional in the form of a porous metal structure.

38. The rechargeable battery cell according to claim 37, wherein the porous metal structure comprises a metal foam.

39. The rechargeable battery cell according to claim 1, wherein the positive electrode and/or the negative electrode comprises a binder, the binder comprising:

a polyvinylidene fluoride and/or a terpolymer made of tetrafluoroethylene, hexafluoropropylene and vinylidene fluoride, or a binder consisting of a polymer which is built up from monomeric structural units of a conjugated carboxylic acid or from the alkali, alkaline earth or ammonium salt of said conjugated carboxylic acid or from a combination thereof, or a binder consisting of a polymer based on monomeric styrene and butadiene structural units, or a binder from the group of carboxymethyl celluloses, wherein the binder is preferably present in a concentration selected from the group consisting of at most 20% by weight, at most 15% by weight, at most 10% by weight, at most 7% by weight, at most 5% by weight and at most 2% by weight based on the total positive electrode weight.

40. The rechargeable battery cell according to claim 1, wherein the negative electrode comprises a plurality of negative electrodes and the positive electrode comprises a plurality of positive electrodes, the negative and positive electrodes being stacked alternately in the housing.

41. The rechargeable battery cell according to claim 40, wherein the positive electrodes and the negative electrodes are each electrically separated from one another by separators.

* * * * *